US010180102B2

(12) United States Patent
Kondo

(10) Patent No.: US 10,180,102 B2
(45) Date of Patent: Jan. 15, 2019

(54) INTAKE AIR COOLING DEVICE FOR ENGINE

(71) Applicant: MAZDA MOTOR CORPORATION, Hiroshima (JP)

(72) Inventor: Hidenari Kondo, Higashihiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 97 days.

(21) Appl. No.: 15/412,592

(22) Filed: Jan. 23, 2017

(65) Prior Publication Data

US 2017/0234207 A1    Aug. 17, 2017

(30) Foreign Application Priority Data

Feb. 12, 2016 (JP) ................................ 2016-024927
Feb. 12, 2016 (JP) ................................ 2016-024928

(51) Int. Cl.
*F02B 29/04* (2006.01)
*F02B 37/00* (2006.01)

(52) U.S. Cl.
CPC ........ *F02B 29/045* (2013.01); *F02B 29/0475* (2013.01); *F02B 37/00* (2013.01); *Y02T 10/146* (2013.01)

(58) Field of Classification Search
CPC ... F02B 29/04–29/0443; F02B 29/0493; F02B 37/00; F02B 37/001; F02B 37/004; F02B 37/007; F02B 37/013

(Continued)

(56) References Cited

U.S. PATENT DOCUMENTS 4,191,148 A     3/1980 Patel et al.
2004/0200449 A1  10/2004 Lang
(Continued)

FOREIGN PATENT DOCUMENTS

JP    S54-17411       2/1979
JP    2001-248448 A   9/2001
(Continued)

OTHER PUBLICATIONS

Machine Translation of JP 2001-248448 A. Date: 2001. Retrieved Jun. 24, 2018.*

(Continued)

*Primary Examiner* — Mark Laurenzi
*Assistant Examiner* — Mickey France
(74) *Attorney, Agent, or Firm* — Studebaker & Brackett PC

(57) ABSTRACT

An intake air cooling device includes an intake manifold communicating with intake ports, and an intercooler disposed laterally of a cylinder head for cooling intake air. The intake manifold includes a manifold body fastened to the cylinder head, and a cooler forming portion communicating with the upstream end of the manifold body and constituting the lower end of the intercooler. Assuming that the cooler forming portion is a second cooler forming portion, the intercooler includes a first cooler forming portion mounted on the upper portion of the second cooler forming portion. The intercooler is constituted by the first and second cooler forming portions. The manifold body includes a plurality of fixing portions fastened to the surface of the cylinder head. The fixing portions are located on the outside of the second cooler forming portion in a side view along a direction orthogonal to the cylinder array direction.

11 Claims, 19 Drawing Sheets

(58) Field of Classification Search
USPC ............. 60/598, 599, 605.1, 612; 123/41.01,
123/559.1, 563, 184.21–184.61
See application file for complete search history.

(56) References Cited

U.S. PATENT DOCUMENTS

2014/0311142 A1* 10/2014 Speidel .................. F02B 33/44
60/599
2015/0345373 A1* 12/2015 Knight .................... F02B 33/40
123/559.1

FOREIGN PATENT DOCUMENTS

JP      2004-538413 A    12/2004
JP      2012-246893 A    12/2012

OTHER PUBLICATIONS

JP Office Action dated Dec. 20, 2017, from corresponding JP Appl No. 2016-024927, with English translation, 6 pp.
An Office Action; "Notification of Reasons for Refusal," issued by the Japanese Patent Office dated Jan. 9, 2018, which corresponds to Japanese Patent Application No. 2016-024928 and is related to U.S. Appl. No. 15/412,592; with English language translation.

* cited by examiner

INTAKE AIR COOLING DEVICE FOR ENGINE

FIELD OF THE INVENTION

The present invention relates to an intake air cooling device for an engine, and more particularly to an intake air cooling device for an engine, which contributes to improvement of the assembling performance of the engine.

BACKGROUND ART

An engine (an internal-combustion engine) has properties such that as the temperature of intake air is lowered, the density of intake air, namely, the weight of intake air increases. Thus, it is possible to combust fuel of a large amount and to improve the engine output. In view of the above, particularly in an engine with a supercharger, an intercooler is disposed on an intake path for cooling intake air.

In this case, employing a water cooling intercooler, and disposing the intercooler at a position near intake ports by integrally mounting the intercooler at a position immediately upstream of an intake manifold is advantageous in efficiently introducing intake air of a low temperature to cylinders. For instance, Japanese Unexamined Patent Publication No. 2001-248448 (hereinafter, referred to as Patent Literature) discloses an intake air cooling device for an internal combustion engine as described above.

When an intercooler is integrally mounted at a position immediately upstream of an intake manifold, if the position of the intercooler is lower than the position of intake ports, water (condensed water) may deposit within the intercooler. When the deposited condensed water is introduced to a combustion chamber together with intake air, an accidental fire may occur. In view of the above, it is desirable to set an intercooler to a relatively high position so that condensed water is speedily introduced to a combustion chamber without depositing within the intercooler. However, there is a limit on an increase in the height of an intercooler, taking into consideration the height of a hood.

Therefore, it is appropriate to dispose an intercooler at a position immediately outside an intake manifold on the side opposite to a cylinder head, as far as the intercooler is not lower than intake ports. However, an intake manifold is fastened to a surface of a cylinder head by bolts and nuts. Therefore, when an intercooler is integrally mounted at a position immediately outside an intake manifold, the intercooler may be an obstacle, i.e. the fastening position of the intake manifold is hidden by the intercooler. This may make it difficult to perform the operation of fastening an intake manifold, and may impair the assembling performance of an engine.

SUMMARY OF THE INVENTION

An object of the present invention is to provide an intake air cooling device for an engine, which enables to integrally mount an intercooler at a position immediately outside an intake manifold on the side opposite to a cylinder head without impairing the assembling performance of the engine.

An aspect of the present invention is directed to an intake air cooling device for an engine with a supercharger, the engine including a cylinder head with a surface in which intake ports are opened, and an intake manifold fixed to the surface of the cylinder head and configured to communicate with the intake ports. The intake air cooling device includes an intercooler which is disposed laterally of the cylinder head and is configured to cool intake air. The intake manifold includes a manifold body fastened to the cylinder head and substantially horizontally extending in a direction orthogonal to a cylinder array direction; and a cooler forming portion integrally communicating with an upstream end of the manifold body in an intake air flow direction, and constituting a lower end of the intercooler. When it is assumed that the cooler forming portion is a second cooler forming portion, the intercooler includes a first cooler forming portion to be mounted on an upper portion of the second cooler forming portion, the intercooler being constituted by the first cooler forming portion and the second cooler forming portion. The manifold body includes a plurality of fixing portions to be fastened to the surface of the cylinder head, the plurality of fixing portions being located on the outside of the second cooler forming portion when the engine is viewed from a side in a direction orthogonal to the cylinder array direction.

These and other objects, features and advantages of the present invention will become more apparent upon reading the following detailed description along with the accompanying drawings.

DESCRIPTION OF EMBODIMENTS

First Embodiment

In the following, the first embodiment of the present invention is described in detail referring to the accompanying drawings.

(Overall Configuration of Engine)

Figure 1:
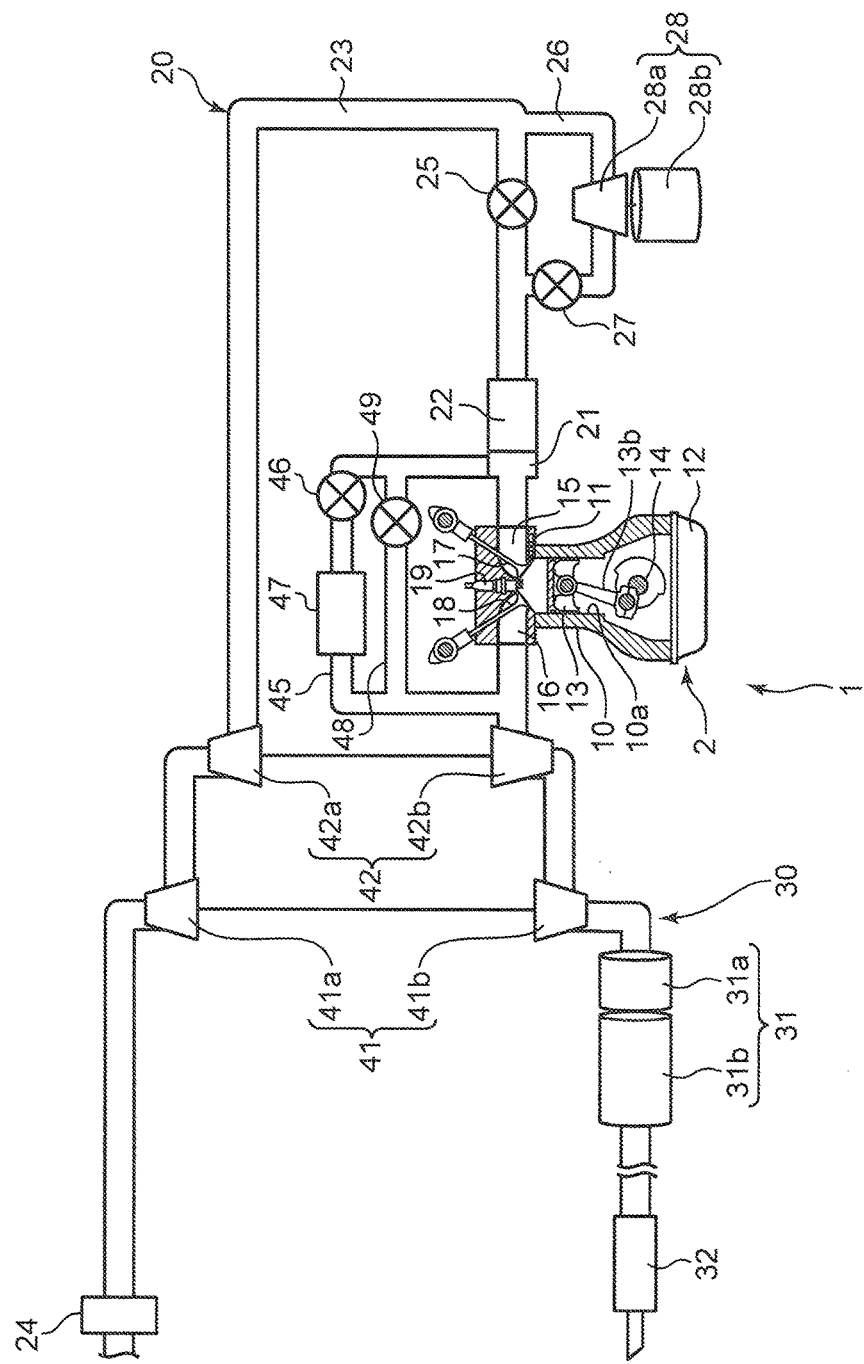
FIG. 1 is an overall configuration diagram of an engine provided with an intake air cooling device according to a first embodiment of the present invention.

FIG. 1 is an overall configuration diagram of an engine provided with an intake air cooling device according to the present invention. An engine 1 illustrated in FIG. 1 is an in-line 4-cylinder 4-cycle diesel engine to be mounted in a vehicle as a power source for driving. Note that in the following description, the terms "upstream" and "downstream" are described on the basis of directions in which fluid (such as intake air, exhaust air, or cooling water) is allowed to flow through a target object.

An engine body 2 of the engine 1 includes a cylinder block 10 having a plurality of cylinders 10a (in FIG. 1, only one cylinder 10a is illustrated), a cylinder head 11 disposed above the cylinder block 10, and an oil pan 12 disposed below the cylinder block 10 and configured to store lubrication oil. The engine body 2 is longitudinally mounted within an engine room of a vehicle front portion in such a manner that the cylinder array direction is aligned with a vehicle front-rear direction.

A piston 13 is reciprocably received in each of the cylinders 10a of the engine body 2. Each of the pistons 13 is connected to a crankshaft 14 via a corresponding connecting rod 13b. The crankshaft 14 is rotated around an axis thereof as the pistons 13 are reciprocated.

An intake port 15 and an exhaust port 16 which are opened in a combustion chamber of each cylinder 10a are formed in the cylinder head 11. Intake valves 17 for opening and closing the intake ports 15, and exhaust valves 18 for opening and closing the exhaust ports 16 are disposed in the cylinder head 11. Further, an injector 19 which injects fuel containing light oil as a main component is disposed for each of the cylinders 10a.

An intake passage 20 is connected to a surface of the cylinder head 11 on one side, specifically, is connected to a surface of the cylinder head 11 on the intake side where the intake ports 15 are opened to communicate with the intake port 15 of each of the cylinders 10a. An exhaust passage 30 is connected to a surface of the cylinder head 11 on the other side, specifically, is connected to a surface of the cylinder head 11 on the exhaust side where the exhaust ports 16 are opened to communicate with the exhaust port 16 of each of the cylinders 10a.

The intake passage 20 includes an intake manifold 21 fixed to the cylinder head 11, an intercooler 22 integrally mounted on the intake manifold 21, and a main intake passage 23 communicating with the upstream end of the intercooler 22.

A first turbocharger 41 of a large size and a second turbocharger 42 of a size smaller than the size of the first turbocharger 41 are mounted on the intake passage 20 (the main intake passage 23) and on the exhaust passage 30.

The first turbocharger 41 includes a compressor 41a disposed on the main intake passage 23, and a turbine 41b coaxially connected to the compressor 41a and disposed on the intake passage 20. Likewise, the second turbocharger 42 includes a compressor 42a disposed on the main intake passage 23, and a turbine 42b coaxially connected to the compressor 42a and disposed on the exhaust passage 30.

The compressor 41a of the first turbocharger 41 is disposed on the upstream side of the main intake passage 23 with respect to the compressor 42a of the second turbocharger 42. The turbine 41b of the first turbocharger 41 is disposed on the downstream side of the exhaust passage 30 with respect to the turbine 42b of the second turbocharger 42.

An air cleaner 24 for filtrating intake air is disposed on the upstream end of the intake passage 20 (the main intake passage 23). The compressor 41a of the first turbocharger 41, the compressor 42a of the second turbocharger 42, an openable/closable throttle valve 25 for regulating the sectional area of the intake passage 20, and the intercooler 22 for cooling air compressed (pressurized) by the compressors 41a and 42a are disposed in this order from the upstream side between the air cleaner 24 and the intake manifold 21.

A bypass passage 26 (corresponding to a branched intake passage of the present invention) which bypasses the throttle valve 25 is disposed on the downstream side of the main intake passage 23 with respect to the second turbocharger 42 (the compressor 42a). The bypass passage 26 is branched from the main intake passage 23 at a position upstream of the throttle valve 25, and is joined to the main intake passage 23 at a position upstream of the intercooler 22. The electric supercharger 28 and a bypass valve 27 are disposed in this order from the upstream side on the bypass passage 26. The electric supercharger 28 includes a compressor 28a disposed on the bypass passage 26, and an electric motor 28b which drives the compressor 28a. The electric supercharger 28 including the electric motor 28b as a drive source has good responsiveness, as compared with the first and second turbochargers 41 and 42 which are operated by using exhaust gas as a drive source, and is less likely to be affected by an operating state of the engine body 2. In view of the above, when the engine 1 is accelerated in a low speed range, the electric supercharger 28 is driven together with the first and second turbochargers 41 and 42 in order to compensate for turbo lag (a delay in a supercharging operation) of the first and second turbochargers 41 and 42.

The upstream portion of the exhaust passage 30 adjacent to the engine body 2 is formed into an exhaust manifold including independent passages which are branched to communicate with the exhaust ports 16 of the cylinders 10a, and a collecting portion at which the independent passages are collected. The turbine 42b of the second turbocharger 42, the turbine 41b of the first turbocharger 41, an exhaust purification device 31 for purifying a harmful component in exhaust gas, and a silencer 32 for reducing exhaust sound are disposed in this order from the upstream side on the downstream side of the exhaust passage 30 with respect to the exhaust manifold.

The exhaust purification device 31 includes an oxidation catalyst 31a having a function of oxidizing CO and HC in exhaust gas, and a DPF 31b having a function of trapping PM (soot) in exhaust gas.

An EGR passage 45 for refluxing a part of exhaust gas to the intake passage 20 is formed between the intake passage 20 and the exhaust passage 30. Specifically, the intake manifold 21, and the exhaust passage 30 between the exhaust manifold and the turbine 42b of the second turbocharger 42 are connected to each other via the EGR passage 45. An openable/closable EGR valve 46 for regulating the amount of exhaust gas to be refluxed to the intake passage 20, and an EGR cooler 47 for cooling exhaust gas by cooling water for the engine are disposed on the EGR passage 45. Further, a bypass passage 48 which bypasses the EGR valve 46 and the EGR cooler 47 is disposed on the EGR passage 45. An openable/closable bypass valve 49 is disposed on the bypass passage 48. Controlling the bypass valve 49 and the EGR valve 46 makes it possible to regulate the flow rate of exhaust gas passing through the EGR cooler 47. In other words, the temperature of exhaust gas to be refluxed to the intake passage 20 is controlled.

(Specific Configuration of Intake Air Cooling Device)

Next, a specific structure of the intake air cooling device according to the present invention is described.

Figure 2:
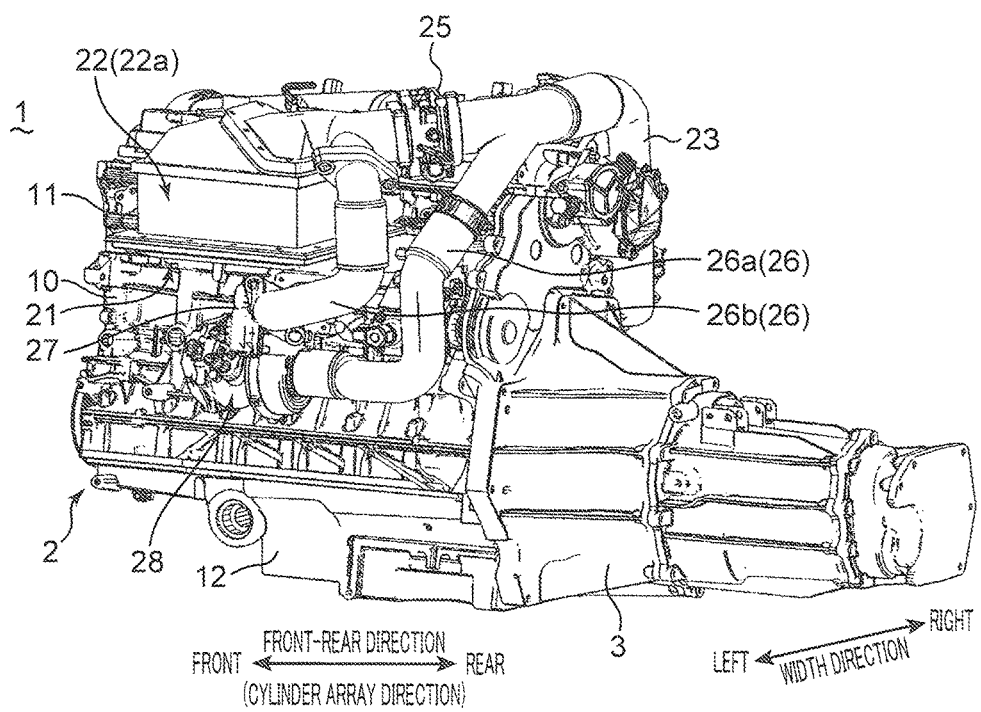
FIG. 2 is a perspective view of the engine when viewed from the intake side.
Figure 3:
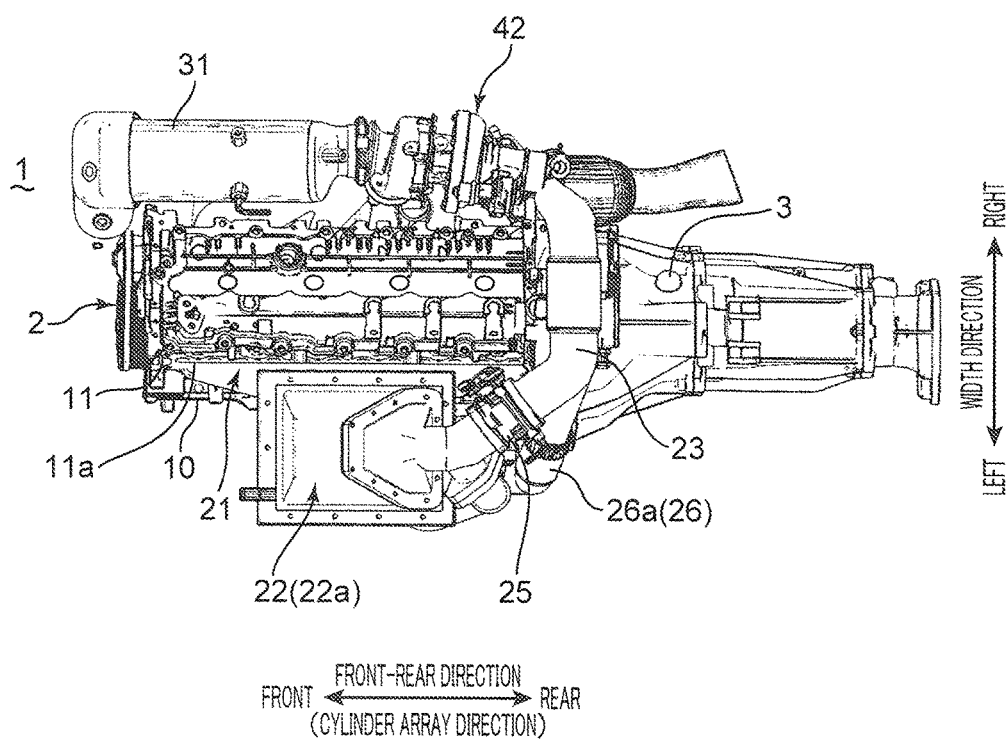
FIG. 3 is a plan view of the engine.

FIG. 2 is a perspective view of the engine 1 when viewed from the intake side. FIG. 3 is a plan view of the engine 1. Note that the directions to be used in the following description are on the basis of the engine body 2, unless otherwise specifically mentioned. Specifically, the cylinder array direction is referred to as a front-rear direction, and a direction orthogonal to the cylinder array direction is referred to as a width direction. As described above, the engine body 2 is longitudinally mounted within an engine room. Therefore, the front side and the rear side coincide with the front side and the rear side of a vehicle, and the right side and the left side coincide with the left side and the right side of the vehicle.

In FIG. 2 and FIG. 3, the reference numeral 3 denotes a transmission. The transmission 3 is mounted on the rear end of the engine body 2. Note that in FIG. 2 and FIG. 3, for convenience of description, illustration of the EGR passage 45 and the bypass passage 48 is omitted.

The engine body 2 has a left intake and right exhaust configuration, in which the intake ports 15 are opened on the left side, and the exhaust ports 16 are opened on the right side. Therefore, the exhaust manifold, the turbochargers 41 and 42, and the exhaust purification device 31 are disposed on the right surface of the engine body 2, specifically, on a surface of the engine body 2 on the exhaust side. On the other hand, the intake manifold 21, the intercooler 22, and the electric supercharger 28 are disposed on the left surface of the engine body 2, specifically, on a surface of the engine body 2 on the intake side. Specifically, the intake manifold 21 is fixed to a surface 11a of the cylinder head 11 on the intake side. The intercooler 22 is integrally mounted on the intake manifold 21. The electric supercharger 28 is disposed below the intake manifold 21 and the intercooler 22. Further, the main intake passage 23 extends upwardly from the second turbocharger 42 along the right surface of the engine body 2, passes the upper portion of the rear end of the engine body 2, and is connected to the upper portion of the intercooler 22. Further, the bypass passage 26 is branched from the main intake passage 23 at the upper portion of the engine body 2. An upstream portion 26a of the bypass passage 26 on the upstream side of the electric supercharger 28 extends downwardly from the upper portion of the engine body 2 along the left surface of the engine body 2, is bent forwardly generally at a right angle along a surface of the cylinder block 10, and is connected to the electric supercharger 28. On the other hand, a downstream portion 26b of the bypass passage 26 on the downstream side of the electric supercharger 28 extends rearwardly from the bypass valve 27, which is integrally mounted on the electric supercharger 28, along the left surface of the engine body 2, is bent rearwardly of the intercooler 22, extends upwardly, and is joined to the main intake passage 23 at a position between the intercooler 22 and the throttle valve 25.

Figure 4:
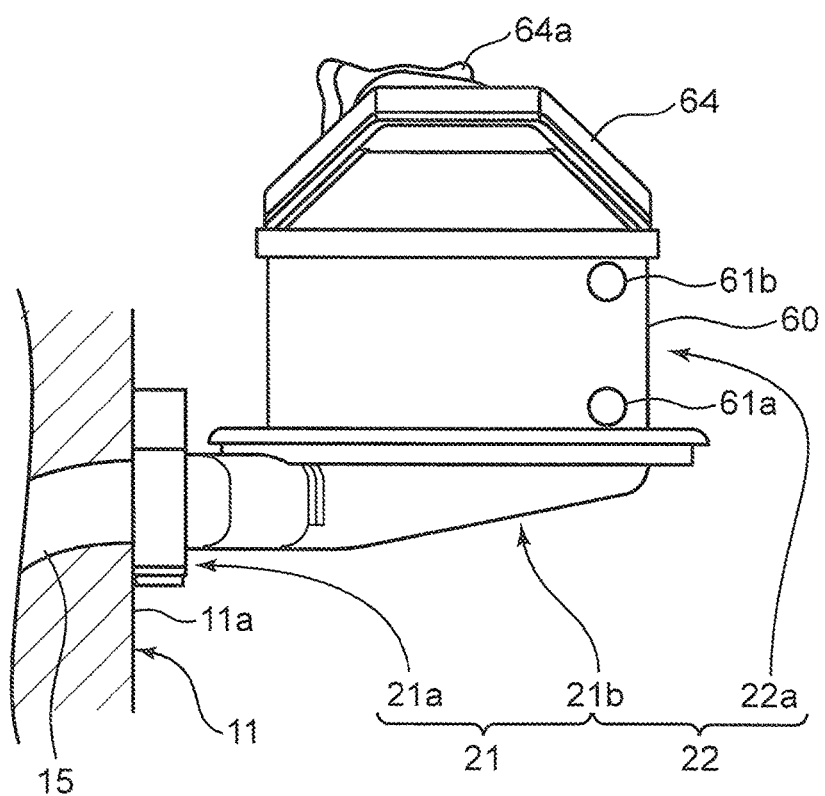
FIG. 4 is a front view of the engine, specifically, illustrating an intake manifold and an intercooler.
Figure 5:
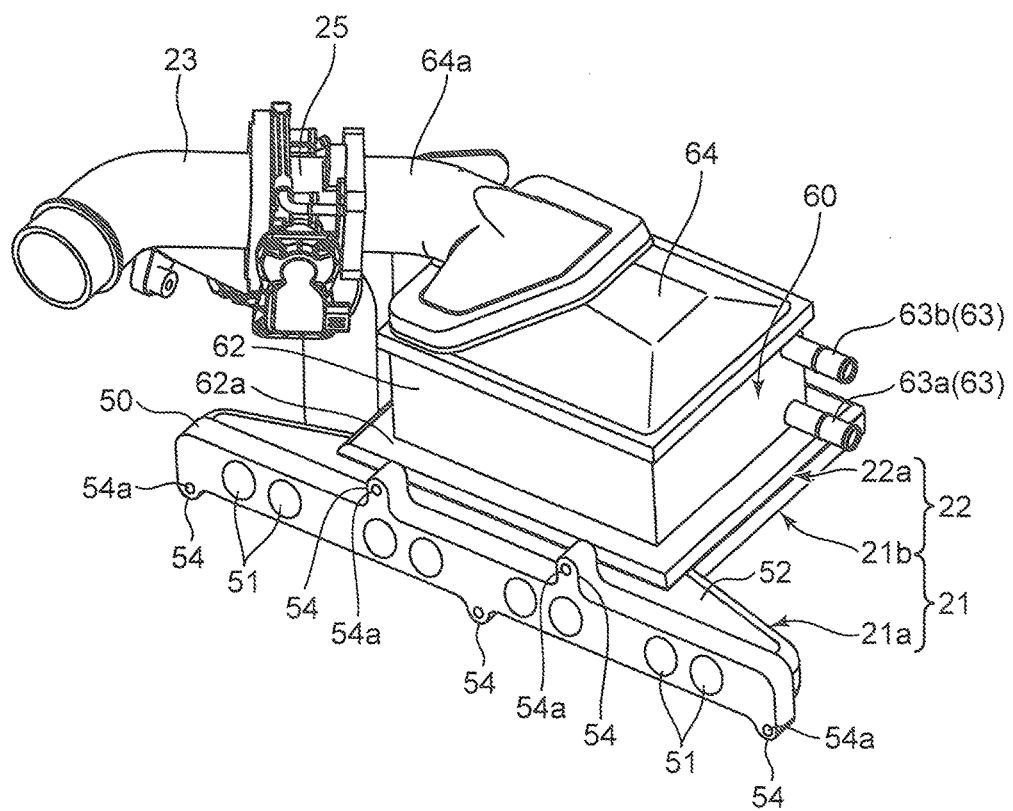
FIG. 5 is a perspective view of an assembly of the intake manifold and the intercooler.
Figure 6:
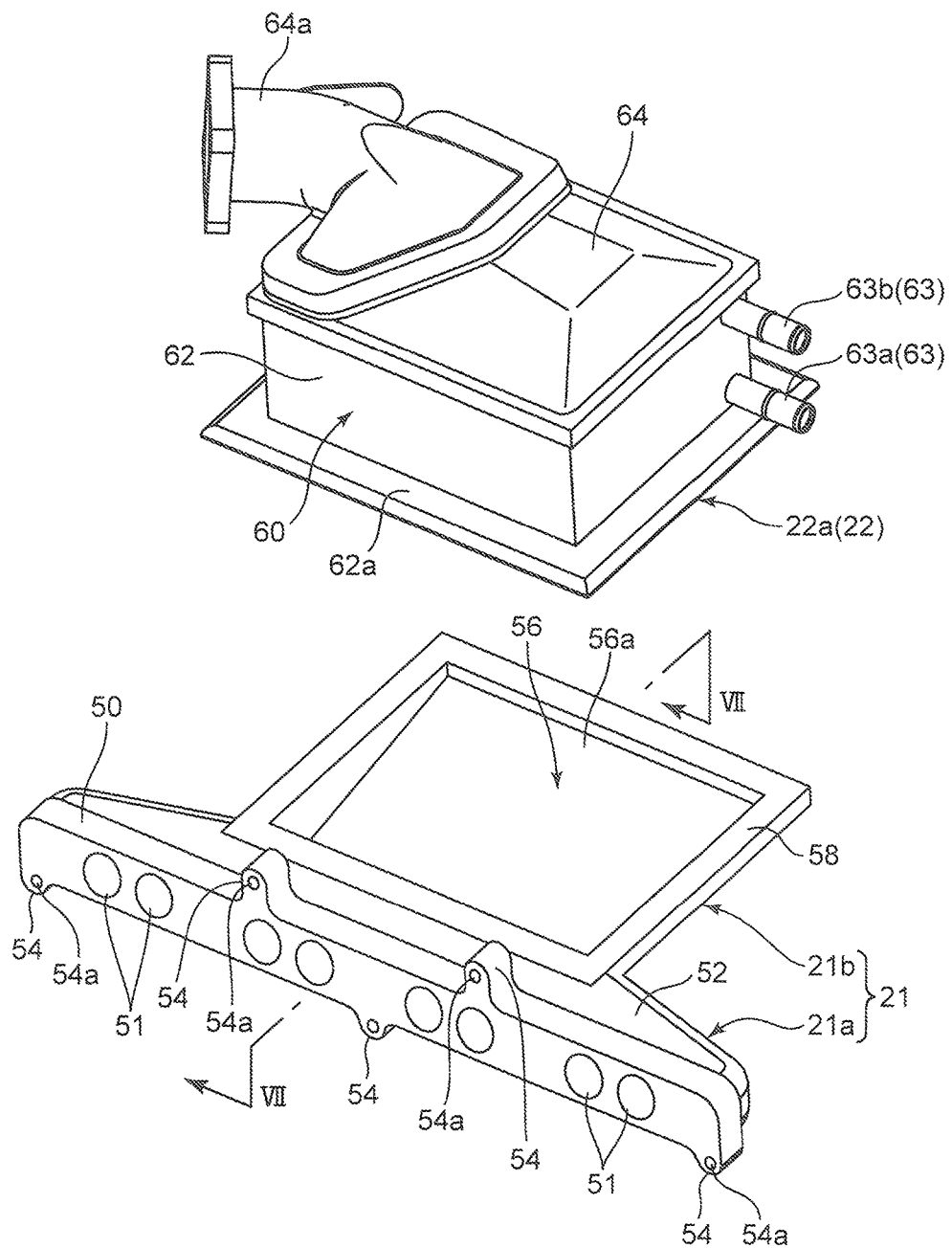
FIG. 6 is an exploded perspective view of the intake manifold and the intercooler.
Figure 7:
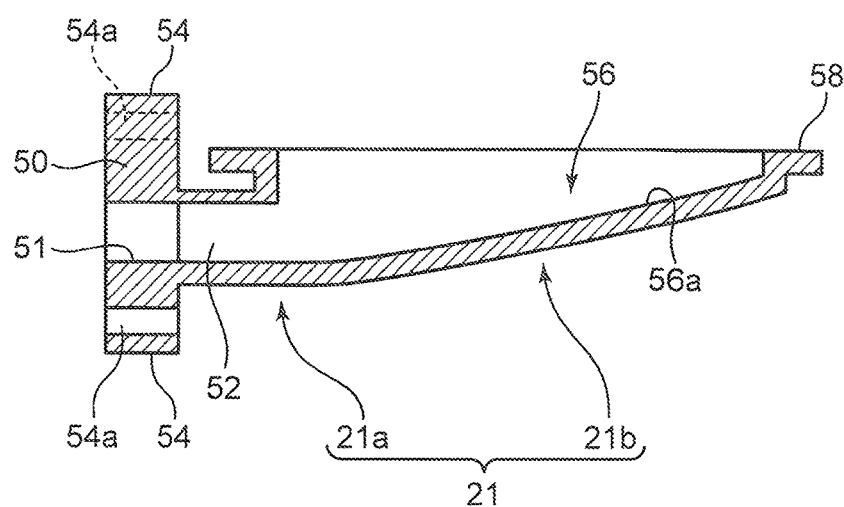
FIG. 7 is a sectional view of the intake manifold taken along the line VII-VII in FIG. 6.

FIG. 4 is a front view of the engine 1, specifically, illustrating the intake manifold 21 and the intercooler 22. FIG. 5 is a perspective view of an assembly of the intake manifold 21 and the intercooler 22. FIG. 6 is an exploded perspective view of the intake manifold 21 and the intercooler 22. Further, FIG. 7 is a sectional view of the intake manifold 21 taken along the line VII-VII in FIG. 6.

As illustrated in FIG. 4 to FIG. 7, the intake manifold 21 includes a manifold body 21a fastened to the surface 11a of the cylinder head 11 on the intake side and extending substantially horizontally in the width direction (a direction orthogonal to the cylinder array direction); and a cooler forming portion 21b (hereinafter, referred to as a second cooler forming portion 21b) which communicates with the upstream end of the manifold body 21a and constitutes a lower end of the intercooler 22.

The manifold body 21a has a shape such that the manifold body 21a extends in the front-rear direction along the surface 11a. The manifold body 21a includes a downstream end 50 where a plurality of independent passages 51 respectively communicating with the intake ports 15 are formed; and a surge tank portion 52 which is located on the upstream side of the downstream end 50, and forms a collecting portion where the independent passages 51 are collected. Note that in the embodiment, an independent passage 51 is formed with respect to each of the intake ports 15a. Alternatively, a common independent passage 51 may be formed with respect to a plurality of intake ports 15.

The second cooler forming portion 21b has a rectangular shape in plan view, and communicates with the surge tank portion 52 at a middle portion of the manifold body 21a in the front-rear direction. Note that in this example, the intake manifold 21 is formed by integrally forming the surge tank portion 52 and the second cooler forming portion 21b of a metal material or a resin material, and by joining the independently molded downstream end 50 to the surge tank portion 52.

The second cooler forming portion 21b includes a recess portion 56 of a rectangular shape in plan view, which is opened upwardly. As illustrated in FIG. 7, the inside of the recess portion 56 communicates with the collecting portion of the surge tank portion 52. An inner bottom surface 56a of the recess portion 56 is tilted downwardly from the outside of the engine body 2 in the width direction inwardly (from the left side to the right side), and is continuously connected to the inner bottom surface of the collecting portion of the surge tank portion 52.

As illustrated in FIG. 4, the intercooler 22 includes a first cooler forming portion 22a to be mounted on the upper portion of the second cooler forming portion 21b of the intake manifold 21. The intercooler 22 is constituted by the first cooler forming portion 22a and the second cooler forming portion 21b.

The first cooler forming portion 22a includes a cooling core 60 of a rectangular shape in plan view, and a ceiling cover 64 of a trapezoidal shape in section, which is fixed to the upper portion of the cooling core 60 and bulges upwardly. The main intake passage 23 is connected to an inlet port 64a formed in the ceiling cover 64 via the throttle valve 25.

Although detailed illustration is omitted, the cooling core 60 is a unit, in which a housing 62 of a rectangular shape in section, which is opened in the up-down direction, a plurality of cooling plates aligned equi-distantly in the front-rear direction within the housing 62, and a water supply/ discharge pipe 63 to be connected to a water channel formed in each of the cooling plates are integrally provided. An inlet port 63a and an outlet port 63b of the water supply/discharge pipe 63 are formed in the front surface of the housing 62. According to this configuration, cooling water of a low temperature (an example of a coolant of the present invention) after heat dissipation by an unillustrated radiator is introduced from the inlet port 63a, and is discharged from the outlet port 63b through each of the cooling plates. In other words, intake air is cooled by heat exchange with cooling water by causing intake air to pass downwardly through the gaps between the adjacent cooling plates of the cooling core 60.

The first cooler forming portion 22a is disposed on the upper portion of the second cooler forming portion 21b of the intake manifold 21, and is fixed to the second cooler forming portion 21b by bolts and nuts. Specifically, the first cooler forming portion 22a is fixed to the second cooler forming portion 21b by placing a fastening flange portion 62a formed at the lower end of the housing 62, and a fastening flange portion 58 formed in the periphery of the recess portion 56 of the second cooler forming portion 21b one over the other, and by fastening the flange portions 62a and 58 to each other by unillustrated bolts and nuts. Further, by fastening the first cooler forming portion 22a and the second cooler forming portion 21b, the first cooler forming portion 22a and the second cooler forming portion 21b constitute the intercooler 22 in cooperation with each other. Specifically, the second cooler forming portion 21b has a function as an outlet port which guides intake air to the manifold body 21a while merging intake air passing through the gaps between the adjacent cooling plates of the cooling core 60.

Note that as illustrated in FIG. 5 to FIG. 7, fixing portions 54 each having a through-hole 54a passing in the width direction are integrally formed on the downstream end 50 of the intake manifold 21. The intake manifold 21 is fixed to the surface 11a of the cylinder 11 by the fixing portions 54. Specifically, an unillustrated bolt is inserted in the through-hole 54a from the outside of each of the fixing portions 54, and the bolts are engaged in screw holes formed in the surface 11a, whereby each of the fixing portions 54 is fastened to the surface 11a. Thus, the intake manifold 21 is fixed to the cylinder head 11.

Two fixing portions 54 are formed on the upper side of the downstream end 50, and three fixing portions 54 are formed on the lower side of the downstream end 50. Each of the fixing portions 54 is formed to locate on the outside of the second cooler forming portion 21b when the engine body 2 is viewed from a side along a direction (the width direction) orthogonal to the cylinder array direction, specifically, when the engine body 2 is viewed from the left side. Specifically, the lower fixing portions 54 are formed at both ends and at a middle portion of the downstream end 50 in the length direction (the front-rear direction). Each of the lower fixing portions 54 projects downwardly from the outer surface of the downstream end 50 in such a manner that the lower fixing portions 54 are located on the lower side than the lower surface of the second cooler forming portion 21b. On the other hand, the upper fixing portions 54 are formed at a position between each of both ends and the middle portion of the downstream end 50 in the length direction (the front-rear direction), namely, at positions equi-distantly away from each other with respect to the middle portion of the downstream end 50. Each of the upper fixing portions 54 projects upwardly from the outer surface of the downstream end 50 in such a manner that the upper fixing portions 54 are located on the upper side than the upper surface of the second cooler forming portion 21b, in other words, on the upper side than the upper surface of the fastening flange portion 58.

As described above, all the fixing portions 54 are located on the outside of the second cooler forming portion 21b when the engine body 2 is viewed from a side. Therefore, as will be described later, it is easy to perform an operation of fastening the fixing portions 54 to the cylinder head 11.

(Advantageous Effects of Intake Air Cooling Device)

According to the configuration of the intake air cooling device as described above, the second cooler forming portion 21b which constitutes the lower end of the intercooler 22 is formed on the intake manifold 21. The intercooler 22 is constituted by the first cooler forming portion 22a and the second cooler forming portion 21b when the first cooler forming portion 22a is fixed on the upper portion of the second cooler forming portion 21b. This makes it possible to integrally mount the intercooler 22 at a position immediately outside the intake manifold 21 (the manifold body 21a) on the side opposite to the cylinder head 11, while suppressing lowering the intercooler 22 than the intake ports 15, and suppressing the intercooler 22 from greatly projecting above the engine body 2. This is advantageous in efficiently introducing intake air of a low temperature cooled by the intercooler 22 to the combustion chambers.

Figure 8:
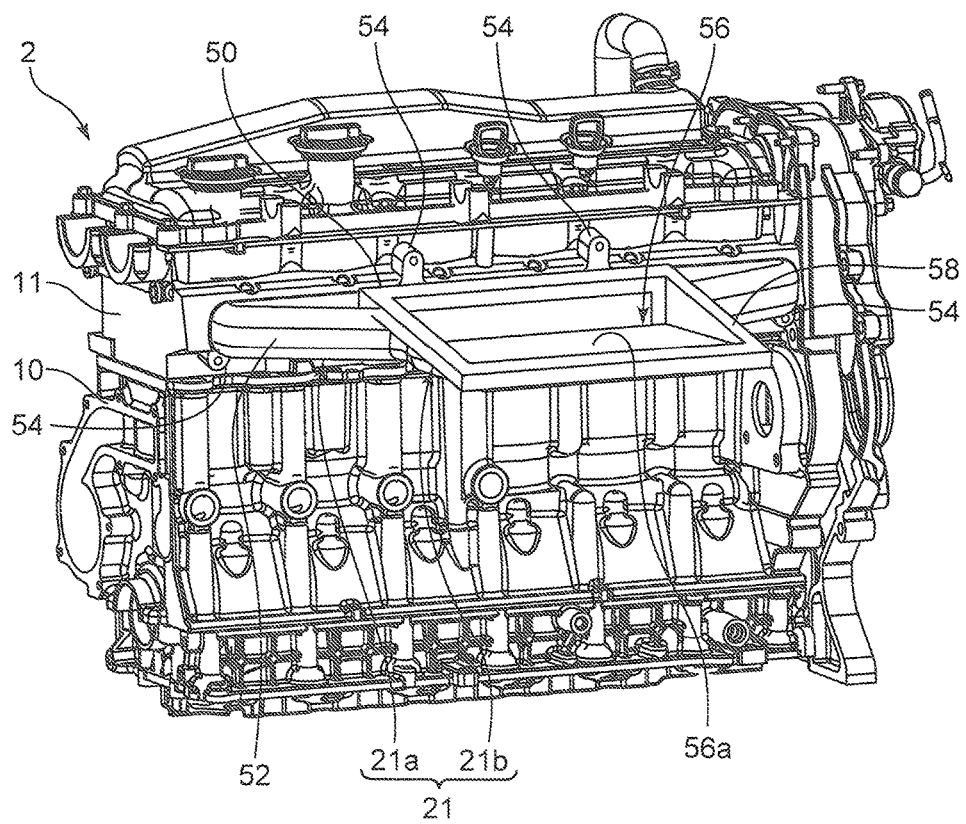
FIG. 8 is a perspective view of an engine body illustrating a state that the intake manifold is mounted.

Further, each of the fixing portions 54 of the intake manifold 21 is located on the outside of the second cooler forming portion 21b when the engine body 2 is viewed from a side. This is advantageous in securing a good assembling performance. Specifically, as illustrated in FIG. 8, fastening the fixing portions 54 to the surface 11a of the cylinder head 11 in a state that the first cooler forming portion 22a is isolated from the second cooler forming portion 21b, and thereafter, fixing the first cooler forming portion 22a on the upper portion of the second cooler forming portion 21b makes it easy to mount the intake manifold 21 and the intercooler 22 on the cylinder head 11. Thus, according to the intake air cooling device, it is possible to integrally mount the intercooler 22 at a position immediately outside the intake manifold 21 (the manifold body 21a) on the side opposite to the cylinder head 11 without impairing the assembling performance of the engine 1. In other words, the aforementioned configuration is advantageous in efficiently introducing intake air of a low temperature cooled by the intercooler 22 into the combustion chambers.

Second Embodiment

Figure 9:
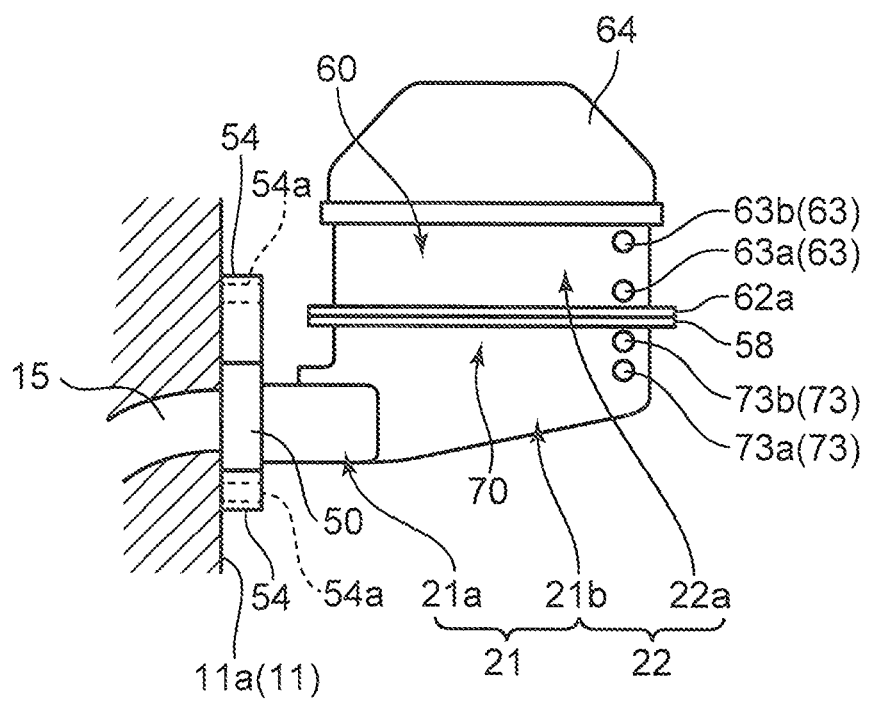
FIG. 9 is a front view of an engine, specifically, illustrating an intake manifold and an intercooler of an intake air cooling device according to a second embodiment of the present invention.

FIG. 9 is a front view of an engine, specifically, illustrating an intake manifold and an intercooler of an intake cooling device according to the second embodiment. Note that the intake air cooling device of the second embodiment is a modification of the first embodiment. The basic configuration of the intake air cooling device of the second embodiment is substantially the same as the intake air cooling device of the first embodiment. Therefore, in the following description, constituent elements common to the first and second embodiments are indicated with the same reference numerals, and the differences between the first and second embodiments are mainly described in detail.

The intake air cooling device of the second embodiment is configured such that a cooling core 70 (referred to as a second cooling core 70) is provided for a second cooler forming portion 21b, in addition to a cooling core 60 (hereinafter, referred to as a first cooling core 60) for a first cooling core portion 22a. The second cooling core 70 includes a plurality of cooling plates (not illustrated) disposed within a recess portion 56 in a state that the cooling plates are aligned equi-distantly in the front-rear direction; and a water supply/discharge pipe 73 to be connected to a water channel formed in each of the cooling plates. An inlet port 73a and an outlet port 73b of the water supply/discharge pipe 73 are formed in the front surface of the second cooler forming portion 21b. Cooling water is introduced from the inlet port 73a, and is discharged from the outlet port 73b through each of the cooling plates. In other words, intake air is cooled while passing downwardly through the gaps between the cooling plates of the first cooling core 60, and is further cooled while passing downwardly through the gaps between the cooling plates of the second cooling core 70.

Note that a water supply/discharge pipe 63 of the first cooling core 60 is formed as a part of an engine cooling water circulation system for cooling an engine body 2. On the other hand, the water supply/discharge pipe 73 of the second cooling core 70 is connected to a dedicated cooling water circulation system provided independently of an engine cooling water circulation system, in other words, is connected to a dedicated cooling water circulation system provided with a dedicated radiator and a dedicated pump. Thus, cooling water of a lower temperature than the temperature of cooling water circulating in the first cooling core 60 circulates in the second cooling core 70.

According to the intake air cooling device of the second embodiment, first of all, intake air is cooled by the first cooling core 60 in which high-temperature cooling water is allowed to pass. Thereafter, intake air is cooled by the second cooling core 70 in which low-temperature cooling water is allowed to pass. Thus, intake air is efficiently cooled by two steps. This is advantageous in enhancing cooling efficiency of intake air.

Figure 10:
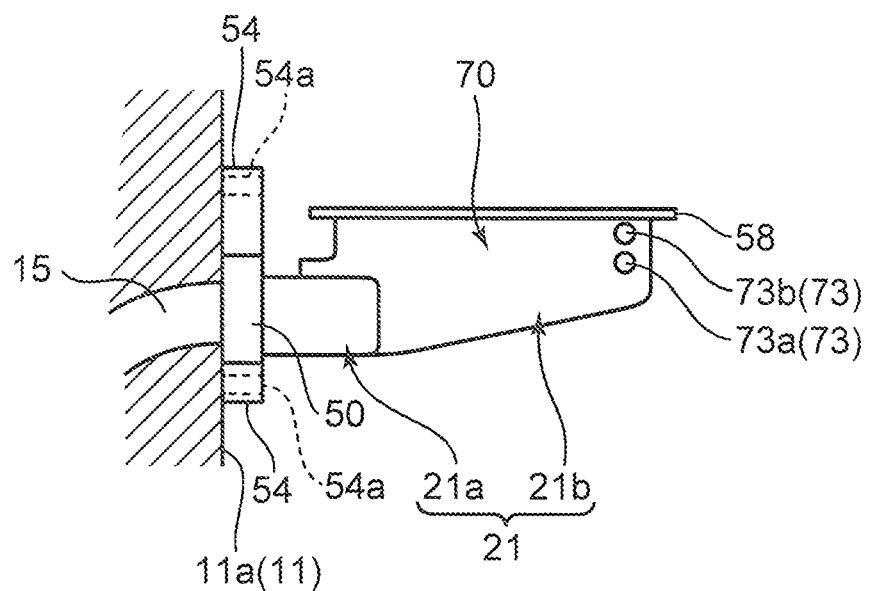
FIG. 10 is a front view of an engine body illustrating a state that the intake manifold is mounted.

Note that in the second embodiment, the second cooling core 70 of an intake manifold 21 is provided in the second cooler forming portion 21b. Therefore, the size of the second cooler forming portion 21b in the up-down direction is increased. Even in this configuration, however, as illustrated in FIG. 10, as far as each of fixing portions 54 is formed to be located on the outside of the second cooler forming portion 21b, it is easy to fix the intake manifold 21 to a surface 11a of a cylinder head 11 by isolating the first cooler forming portion 22a at the time of assembling an engine 1.

Third Embodiment

Figure 11:
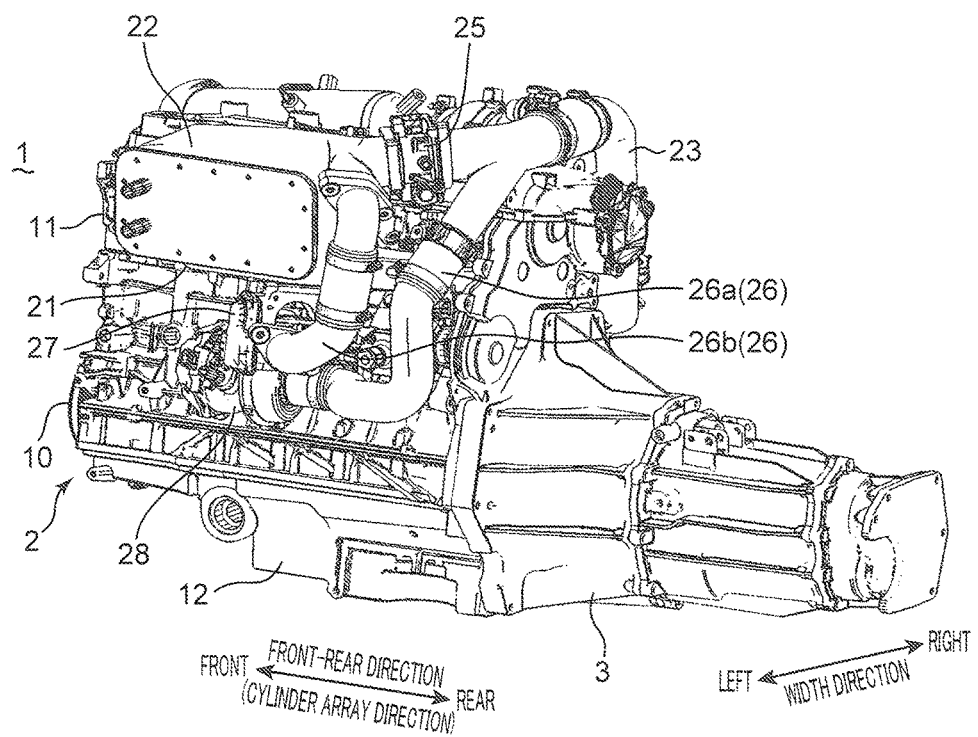
FIG. 11 is a perspective view of an engine provided with an intake air cooling device according to a third embodiment of the present invention, when viewed from the intake side.

FIG. 11 is a perspective view of an engine including an intake air cooling device according to the third embodiment, when viewed from the intake side. FIG. 12 to FIG. 15 illustrate an intake manifold 21 and an intercooler 22.

Note that the schematic overall configuration of the intake air cooling device of the third embodiment is substantially the same as the intake air cooling device of the first embodiment. Therefore, in the following description about the intake air cooling device of the third embodiment, constituent elements common to the first and third embodiments are indicated with the same reference numerals, as necessary.

Figure 14:
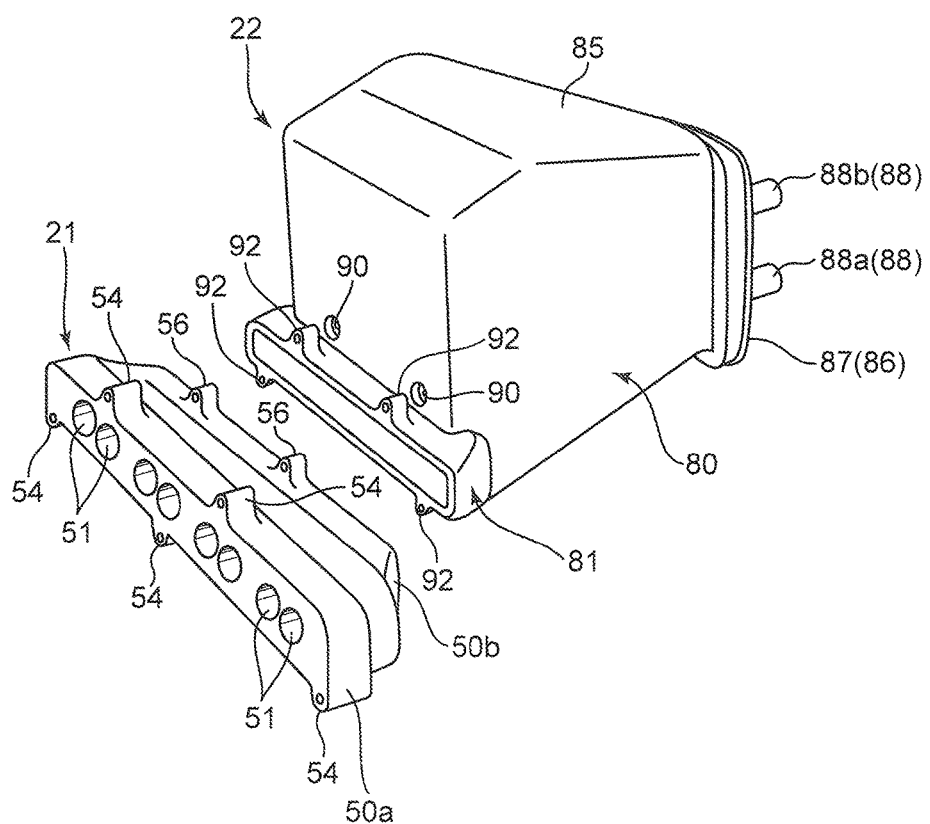
FIG. 14 is an exploded perspective view of the intake manifold and the intercooler.

As illustrated in FIG. 14, the intake air cooling device of the third embodiment has a structure in which the intake manifold 21 and the intercooler 22 are provided independently of each other. Specifically, the intake manifold 21 is not provided with a second cooler forming portion 21b.

Figure 15:
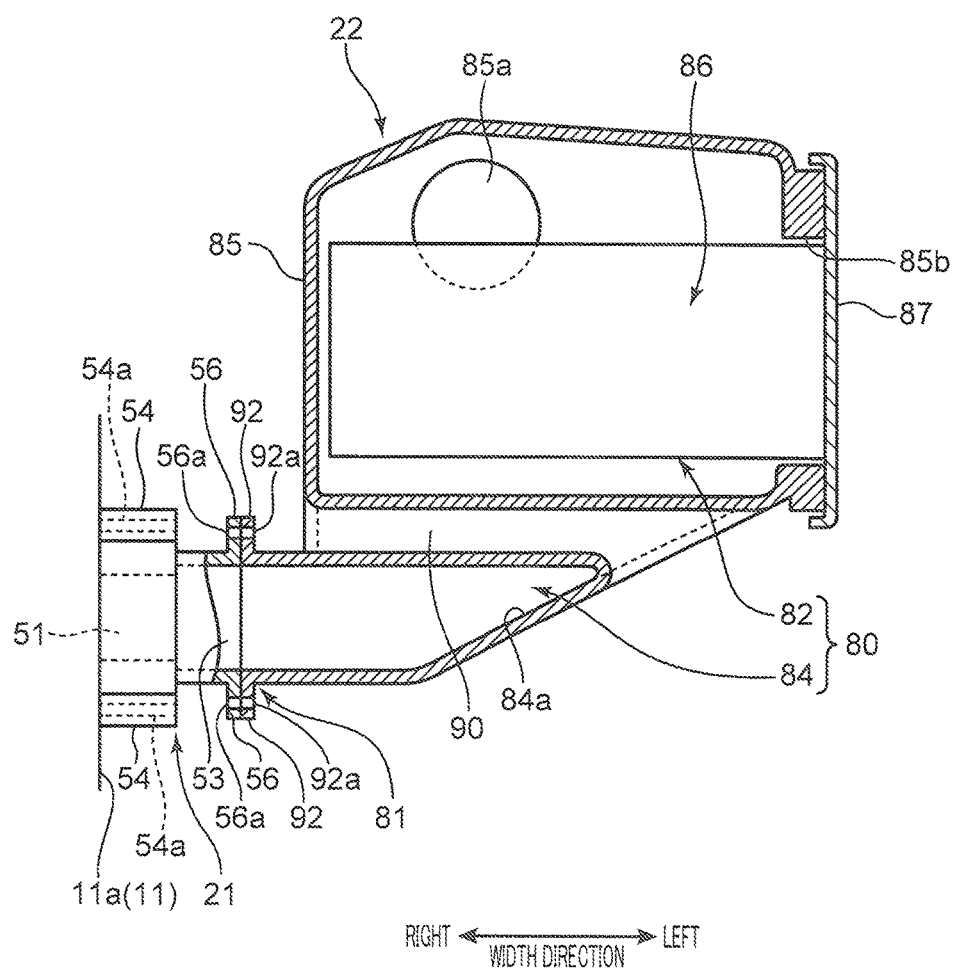
FIG. 15 is a sectional view of the intake manifold and the intercooler taken along the line XV-XV in FIG. 13.

As illustrated in FIG. 14 and FIG. 15, the intake manifold 21 includes a plurality of independent passages 51 aligned with each other in the front-rear direction (the cylinder array direction) and configured to respectively communicate with intake ports 15; and a collecting portion 53 located on the upstream side of the independent passages 51 and at which the independent passages 51 are collected.

The intake manifold 21 includes flange-shaped first fixing portions 54 at a plurality of positions circumferentially on the outer surface of a downstream end 50a of the intake manifold 21, and flange-shaped second fixing portions 56 at a plurality of positions circumferentially on the outer surface of an upstream end 50b of the intake manifold 21. The first fixing portions 54 are configured to fix the intake manifold 21 to a cylinder head 11. Each of the first fixing portions 54 includes a through-hole 54a passing in the width direction. The second fixing portions 56 are configured to fix the intercooler 22 to the intake manifold 21. Each of the second fixing portions 56 includes a through-hole 56a passing in the width direction as well as the first fixing portions 54.

Two first fixing portions 54 are formed on the upper side of the intake manifold 21, and three first fixing portions 54 are formed on the lower side of the intake manifold 21. The lower first fixing portions 54 are formed at both ends and at a middle portion of the intake manifold 21 in the length direction (the front-rear direction). Each of the lower first fixing portions 54 projects downwardly from the lower surface of the intake manifold 21. On the other hand, the upper first fixing portions 54 are formed at positions equi-distantly away from each other with respect to the middle portion of the intake manifold 21. Each of the upper first fixing portions 54 projects upwardly from the upper surface of the intake manifold 21. Each of the first fixing portions 54 is fastened to a surface 11a of the cylinder head 11 when an unillustrated bolt is inserted in each of the through-holes 54a from the outside and the bolts are engaged in screw holes formed in the surface 11a of the cylinder head 11. Thus, the intake manifold 21 is fixed to the cylinder head 11.

On the other hand, each two second fixing portions 56 are formed on the upper side and the lower side of the intake manifold 21. The second fixing portions 56 are offset with respect to the first fixing portions 54 in the front-rear direction in such a manner that the second fixing portions 56 do not interfere when the fixing portions 54 are fastened to the cylinder head 11. In other words, the first fixing portions 54 and the second fixing portions 56 are disposed at positions different from each other circumferentially of the intake manifold 21 (in a direction along the length direction). Specifically, the two second fixing portions 56 on the upper side of the intake manifold 21 are formed at positions away from each other by a predetermined interval between the two first fixing portions 54 on the upper side. The two second fixing portions 56 on the lower side of the intake manifold 21 are formed at positions between adjacent first fixing portions 54 out of the three first fixing portions 54 on the lower side.

Figure 13:
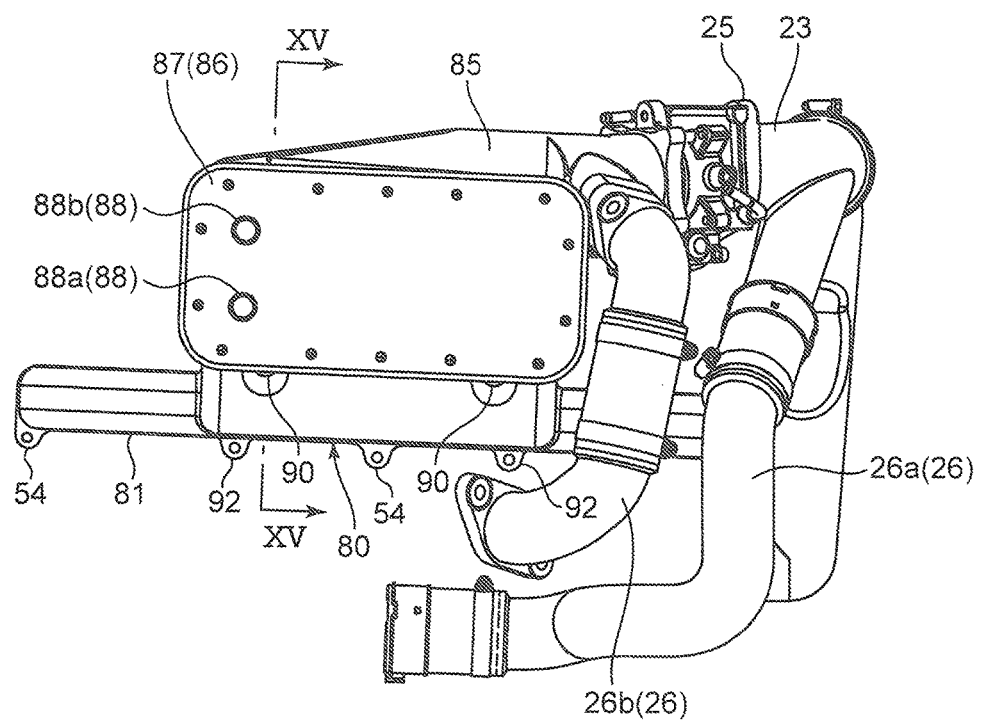
FIG. 13 is a side view of the intake manifold and the intercooler.

Note that in this example, each two first and second fixing portions 54 and 56 located on the upper side of the intake manifold 21, out of the first and second fixing portions 54 and 56, are located on the inner side than both ends of the intercooler 22 in the front-rear direction. In other words, as illustrated in FIG. 13 and FIG. 14, the aforementioned each two first and second fixing portions 54 and 56 are located at positions hidden from the intercooler 22 when an engine body 2 is viewed from a side (viewed from the left side).

Figure 12:
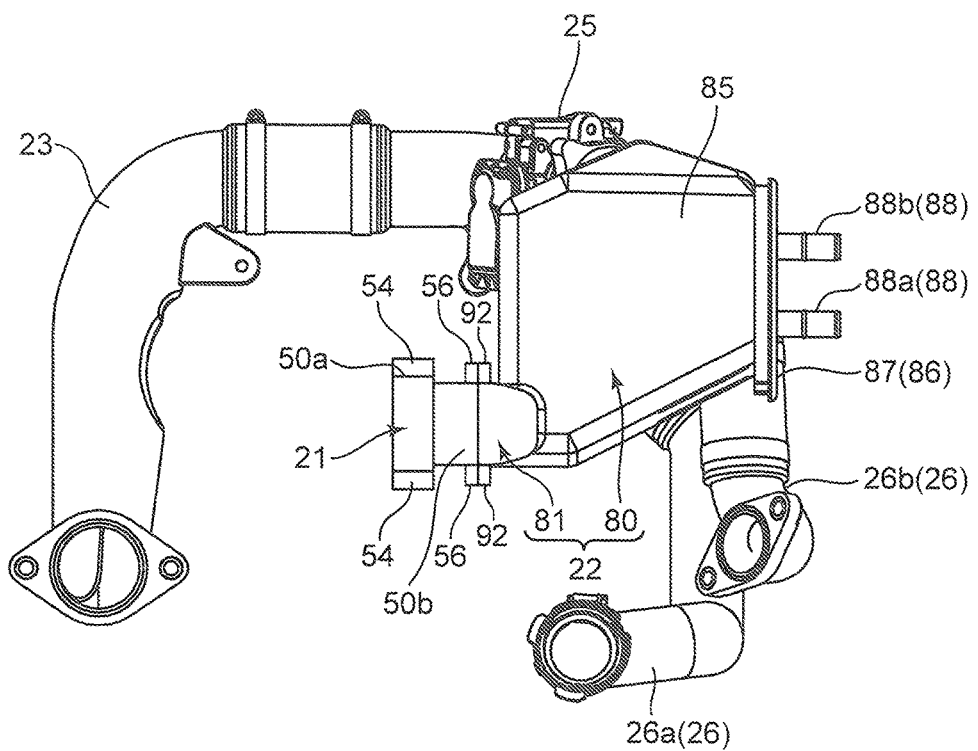
FIG. 12 is a front view of an intake manifold and an intercooler of the engine.

As illustrated in FIG. 12, FIG. 14, and FIG. 15, the intercooler 22 is disposed at a position immediately outside the intake manifold 21 on the side opposite to the cylinder head 11, and is directly i.e. integrally fixed to the intake manifold 21. Specifically, the intercooler 22 includes a substantially rectangular parallelepiped intercooler body 80, and a connecting portion 81 formed at the lower end of a surface of the intercooler body 80 on the side opposite to the cylinder head 11. Further, as will be described later, the intercooler 22 is integrally fixed to the intake manifold 21 by connecting the connecting portion 81 to the upstream end 50a of the intake manifold 21.

As illustrated in FIG. 15, the intercooler body 80 includes a cooling portion 82 which cools intake air to be introduced through a main intake passage 23, and a guiding portion 84 located on the lower side of the cooling portion 82 and configured to guide cooled intake air to the connecting portion 81.

The cooling portion 82 and the guiding portion 84 include a housing 85 common to the cooling portion 82 and the guiding portion 84. The cooling portion 82 includes a cooling core 86 disposed within the housing 85. The cooling core 86 is a unit, in which a plurality of cooling plates (not illustrated) aligned equi-distantly in the width direction, and a water supply/discharge pipe 88 to be connected to a water channel formed in each of the cooling plates are integrally provided. The cooling core 86 includes a fixing plate 87 also serving as a left side cover of the housing 85. As illustrated in FIG. 15, placing the cooling core 86 into the housing 85 through an opening 85b formed in the left surface of the housing 85, and fixing the fixing plate 87 to the housing 85 by unillustrated bolts makes it possible to support the cooling core 86 to the housing 85. An inlet port 88a and an outlet port 88b of the water supply/discharge pipe 88 are formed in the fixing plate 87. According to this configuration, cooling water of a low temperature after heat dissipation by an unillustrated radiator is introduced from the inlet port 88a, and is discharged from the outlet port 88b through each of the cooling plates. In other words, intake air is cooled by heat exchange with cooling water by introducing intake air into the intercooler 22 (i.e. into the housing 85) from an intake air introducing port 85a, which is formed in the upper portion of the rear surface of the housing 85, and by causing intake air to pass downwardly through the gaps between the adjacent cooling plates of the cooling core 86.

The guiding portion 84 guides intake air passing downwardly in the cooling core 86 toward the right side, in other words, toward the cylinder head 11 side. The guiding portion 84 is a member obtained by forming the lower end of the housing 85 into a passage shape. The downstream end of the guiding portion 84 communicates with the connecting portion 81. According to this configuration, intake air cooled by the cooling portion 82 is introduced to the intake manifold 21 through the connecting portion 81. Note that the connecting portion 81 has a hollow shape extending in the front-rear direction (the cylinder array direction), and is configured such that the width thereof is gradually increased in the front-rear direction from the upstream side toward the downstream side (from the intercooler body 80 side toward the intake manifold 21 side). According to this configuration, a so-called surge tank is formed by cooperation of the internal space of the connecting portion 81 and the upstream portion of the intake manifold 21 (the collecting portion 53).

Note that as illustrated in FIG. 15, an inner bottom surface 84a of the guiding portion 84 is tilted downwardly from the outside of the engine body 2 in the width direction inwardly (from the left side to the right side), and is continuously connected to the inner bottom surface of the connecting portion 81.

Flange-shaped fixing portions 92 (referred to as third fixing portions 92), each of which includes a through-hole 92a passing in the width direction, are formed at a plurality of positions on the outer surface of the connecting portion 81, specifically at positions opposite to the second fixing portions 56 of the intake manifold 21. Further, by causing the downstream end of the connecting portion 81 and the upstream end of the intake manifold 21 to abut against each other, and by fastening the second fixing portions 56 and the third fixing portions 92 by unillustrated bolts and nuts, the intercooler 22 is fixed to the intake manifold 21.

Note that as illustrated in FIG. 13 and FIG. 14, the two third fixing portions 92 on the upper side of the connecting portion 81 out of the third fixing portions 92 are located at positions hidden from the intercooler 22 when the engine body 2 is viewed from a side (viewed from the left side) in order to align with the second fixing portions 56. In view of the above, as illustrated in FIG. 14 and FIG. 15, a pair of tool insertion through-holes 90, each of which passes through the guiding portion 84 in the width direction are respectively formed in the guiding portion 84 of the intercooler body 80 at positions associated with the third fixing portions 92 in order to implement a fastening operation of the third fixing portions 92. The tool insertion through-holes 90 are formed into a joined tubular shape through a pair of surfaces of the housing 85 in the width direction. The tool insertion through-holes 90 are through-holes of a circular shape in section, with an inner diameter capable of receiving a bolt and nut fastening driver. The tool insertion through-holes 90 are formed in parallel to each other substantially horizontally. In other words, it is possible to fasten the second and third fixing portions 56 and 92 at positions hidden from the intercooler body 80 by inserting the tool (the bolt and nut fastening driver) into the tool insertion through-holes 90 in fixing the intercooler 22 to the intake manifold 21.

According to the configuration of the intake air cooling device of the third embodiment as described above, the intercooler 22 is disposed at a position immediately outside the intake manifold 21 (the manifold body 21a) on the side opposite to the cylinder head 11. The intake manifold 21 and the intercooler 22 are directly connected each other, and are integrally mounted. This makes it possible to dispose the intercooler 22 at a position close to the intake ports 15 as much as possible. This is advantageous in efficiently introducing intake air of a low temperature cooled by the intercooler 22 into combustion chambers.

Further, the intercooler 22 is connected to the intake manifold 21 via the connecting portion 81, which is formed at the lower end of a surface of the intercooler body 80, and the lower end of the intercooler 22 is disposed substantially at the same height as the intake ports 15. Therefore, condensed water generated within the intercooler 22 (the housing 85) is speedily introduced to the intake ports 15 through the intake manifold 21. This makes it possible to suppress deposition of a large amount of condensed water within the intercooler 22. Further, the lower end of the intercooler 22 is disposed laterally of the intake ports 15 as described above (see FIG. 15). This makes it possible to dispose the intercooler 22 at a relatively low position with respect to the engine body 2. In other words, according to the intake air cooling device, it is possible to suppress lowering the lower end (the downstream end) of the intercooler 22 than the intake ports 15, and to suppress the intercooler 22 from greatly projecting above the engine body 2.

Figure 16:
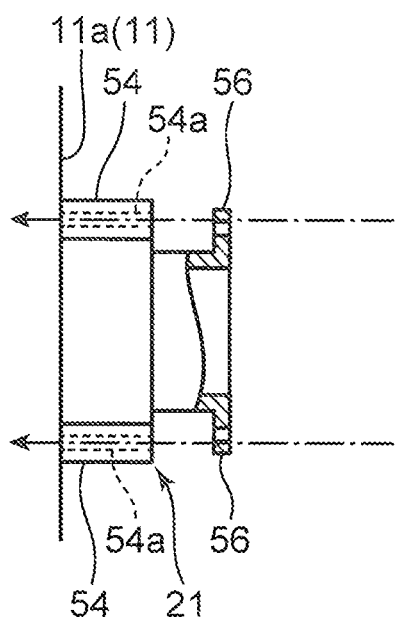
FIG. 16 is a diagram illustrating a step of mounting the intake manifold on a cylinder block.
Figure 17:
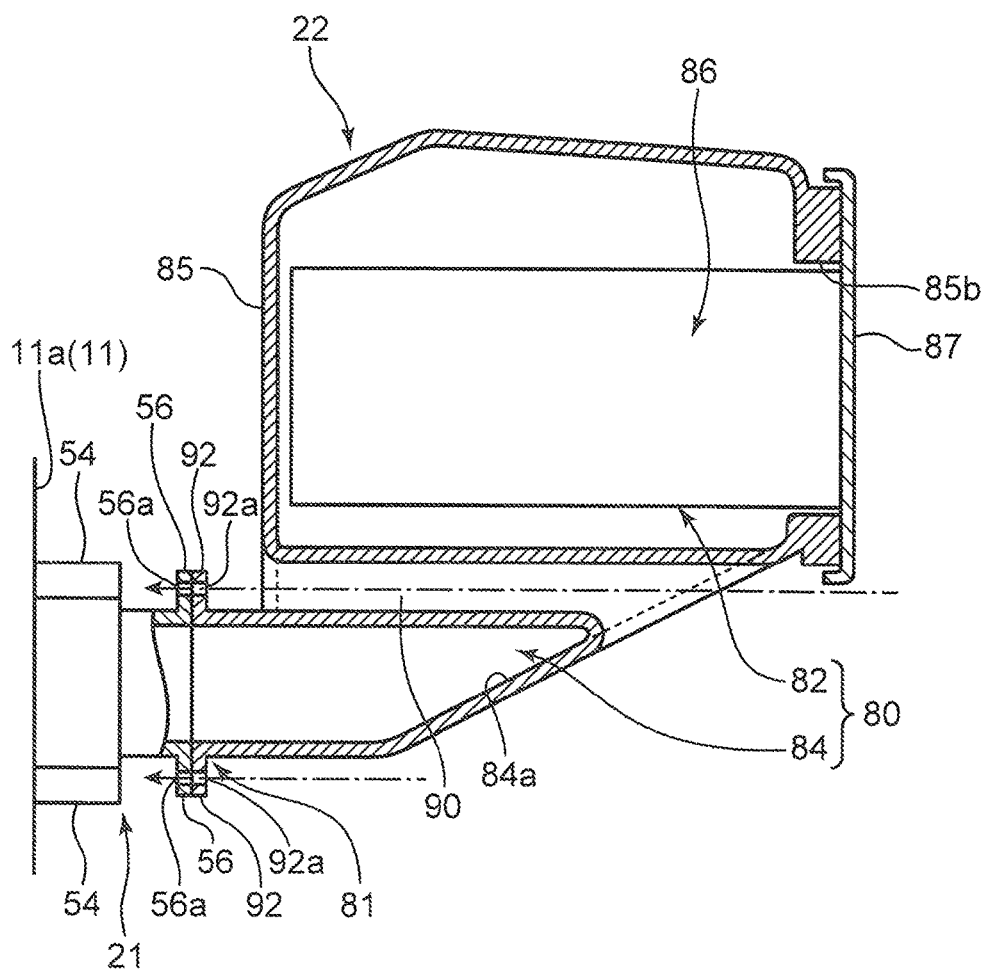
FIG. 17 is a diagram illustrating a step of mounting an intercooler on the intake manifold.

Further, it is also easy to mount the intake manifold 21 and the intercooler 22 on the cylinder head 11 by performing the following operation. Specifically, as illustrated in FIG. 16, first of all, the intake manifold 21 as a single member is fixed to the surface 11a of the cylinder head 11 by fastening the first fixing portions 54 of the intake manifold 21 to the surface 11a of the cylinder head 11 by unillustrated bolts. In this case, as illustrated by the one-dotted chain line arrow in FIG. 16, it is possible to perform a bolt fastening operation laterally of the cylinder head 11 horizontally, because the first fixing portions 54 and the second fixing portions 56 are offset from each other in the front-rear direction (in a direction orthogonal to the plane of FIG. 16). Next, as illustrated in FIG. 17, the connecting portion 81 of the intercooler 22 is caused to abut against the upstream end of the intake manifold 21, and the second fixing portions 56 and the third fixing portions 92 are fastened to each other by unillustrated bolts and nuts. In this case, as illustrated by the one-dotted chain line arrow in FIG. 17, it is possible to perform a fastening operation laterally of the cylinder head 11 horizontally, because the third fixing portions 92 on the lower side of the connecting portion 81 project downwardly than the lower surface of the intercooler body 80. On the other hand, the third fixing portions 92 on the upper side of the connecting portion 81 are hidden by the intercooler body 80. However, as illustrated by the one-dotted chain line arrow in FIG. 17, it is possible to perform a fastening operation laterally of the cylinder head 11 horizontally by inserting the tool into the tool insertion through-holes 90 formed in the intercooler body 80 for fastening as well as the aforementioned operation. Thus, it is easy to mount the intake manifold 21 and the intercooler 22 on the cylinder head 11.

Further, the configuration of the intake air cooling device of the third embodiment also provides the following advantages. For instance, the following configuration may be proposed (hereinafter, referred to as a comparative example). Specifically, the first and second fixing portions 54 and 56 may be omitted by integrally forming the intake manifold 21 and the housing 85 of the intercooler 22 of a same material. At the time of assembling an engine, the first fixing portions 54 may be fastened to the cylinder head 11 by bolts with use of a tool inserted in the tool insertion through-holes 90. However, it may be impossible to form the tool insertion through-holes 90 at positions associated with the fastening positions (positions of the first fixing portions 54) of the intake manifold 21 depending on various conditions such as a fixing intensity of the intake manifold 21 or a structure of the intercooler 22. In this case, it may be difficult to apply the aforementioned configuration as it is. Contrary to the above, according to the configuration of the embodiment, it is possible to avoid a drawback that the position of the tool insertion through-holes 90 and the position of the first fixing portions 54 are mutually constrained, because it is not necessary to align the position of the tool insertion through-holes 90 with the position of the first fixing portions 54. In other words, it is possible to set the position of the tool insertion through-holes 90 at an advantageous position, and to determine the positions of the second fixing portions 56 and the third fixing portions 92 on the basis of the position of the tool insertion through-holes 90. Further, it is possible to set the position of the first fixing portions 54 independently of the positions of the second and third fixing portions 56 and 92. This is advantageous in avoiding a drawback as described above in the comparative example.

Note that in the intake manifold 21 of the third embodiment, the second fixing portions 56 are offset with respect to the first fixing portions 54 in the front-rear direction. Alternatively, as far as a fastening operation of the first fixing portions 54 is not obstructed, for instance, as far as the positions of the through-holes 54a and 56a are offset from each other in the up-down direction, the first fixing portions 54 and the second fixing portions 56 may be formed at the same positions in the front-rear direction.

Fourth Embodiment

Figure 18:
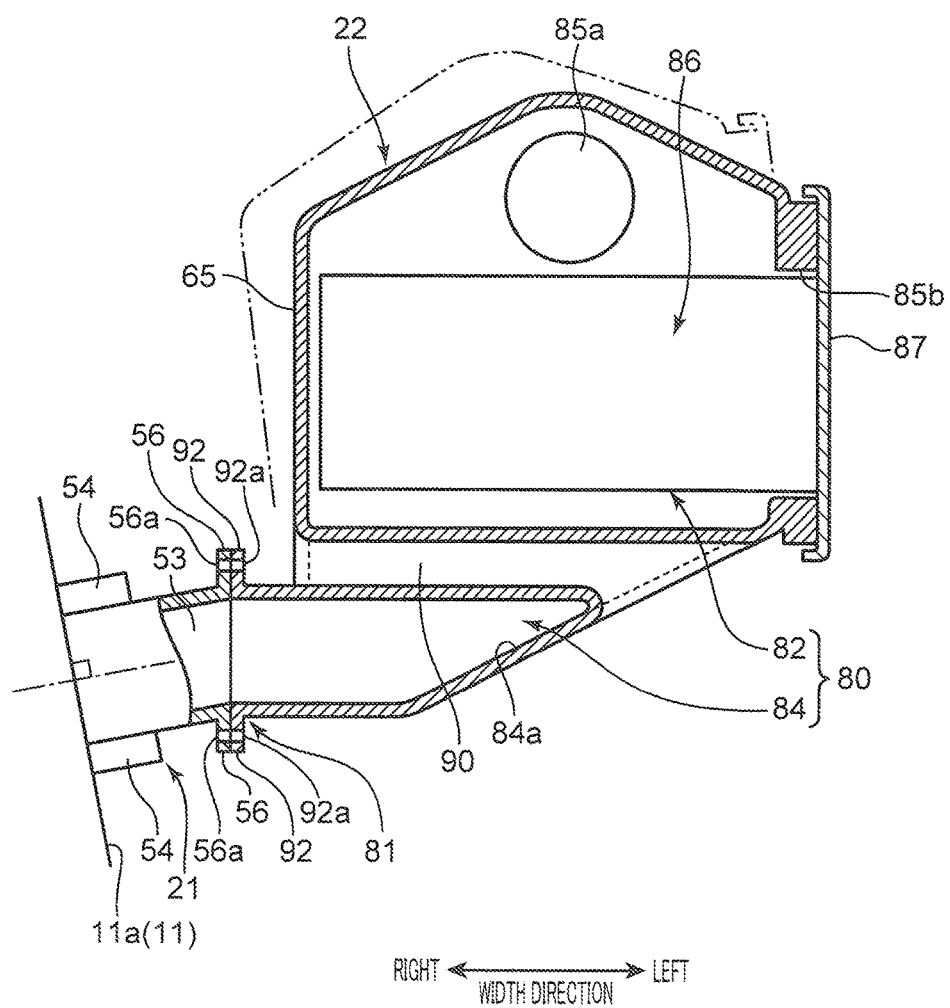
FIG. 18 is a front view of an engine, specifically, illustrating an intake manifold and an intercooler of an intake air cooling device according to a fourth embodiment of the present invention.

FIG. 18 is a front view of an engine, specifically, illustrating an intake manifold and an intercooler of an intake air cooling device according to the fourth embodiment. Note that the intake air cooling device of the fourth embodiment is a modification of the third embodiment. The basic configuration of the intake air cooling device of the fourth embodiment is substantially the same as the intake air cooling device of the third embodiment. Therefore, in the following description, constituent elements common to the third and fourth embodiments are indicated with the same reference numerals, and only the differences between the third and fourth embodiments are described in detail. The same idea as described above is applied to an intake air cooling device according to a fifth embodiment to be described later.

The fourth embodiment is directed to an intake air cooling device, which is advantageously used when a surface 11a of a cylinder head 11 is tilted obliquely upwardly. As an example of this configuration, for instance, a configuration in which a cylinder head itself of an engine body 2 is tilted, as exemplified by a V-shaped engine is proposed, in addition to a configuration in which an engine 1 is disposed within an engine room in a tilted state.

As illustrated in FIG. 18, an intake manifold 21 extends vertically with respect to a surface 11a of a cylinder head 11. According to this configuration, the upstream end of the intake manifold 21 is formed of a vertical surface, although the intake manifold 21 is tilted with respect to a horizontal plane. Further, whereas first fixing portions 54 are formed along the surface 11a, second fixing portions 56 are formed vertically along the upstream end of the intake manifold 21. According to this configuration, the intake manifold 21 and a connecting portion 81 of an intercooler 22 are connected in a bent state. Note that the intercooler 22 in the fourth embodiment is the same as in the third embodiment.

The intake air cooling device of the fourth embodiment is advantageous in suppressing the height of the intercooler 22 in an engine body 2 configured such that the surface 11a of the cylinder head 11 is tilted obliquely upwardly. Specifically, if the intake manifold 21 as described in the third embodiment is applied to the tilted surface 11a as illustrated in FIG. 18, the upstream end of the intake manifold 21 is alto tilted. As a result, the entirety of the intercooler 22 to be connected to the intake manifold 21 is also tilted as illustrated by the two-dotted chain line in FIG. 18. On the other hand, according to the configuration of the fourth embodiment, the upstream end of the intake manifold 21 is vertically formed. Therefore, the posture of the intercooler 22 to be connected to the intake manifold 21 is kept horizontally. This makes it possible to suppress the height of the intercooler 22, as is clear from comparison with the two-dotted chain line position in FIG. 18.

Further, the second fixing portions 56 of the intake manifold 21 are formed vertically along the upstream end of the intake manifold 21. This makes it possible to perform a bolt fastening operation of the second and third fixing portions 54 and 92 in connecting the intercooler 22 to the intake manifold 21 horizontally in the same manner as in the third embodiment.

Thus, according to the intake air cooling device of the fourth embodiment, it is possible to suppress the height of the intercooler 22 particularly in the engine body 2 configured such that the surface 11a of the cylinder head 11 is tilted obliquely upwardly, while providing substantially the same advantageous effects as the intake air cooling device of the third embodiment.

Fifth Embodiment

Figure 19:
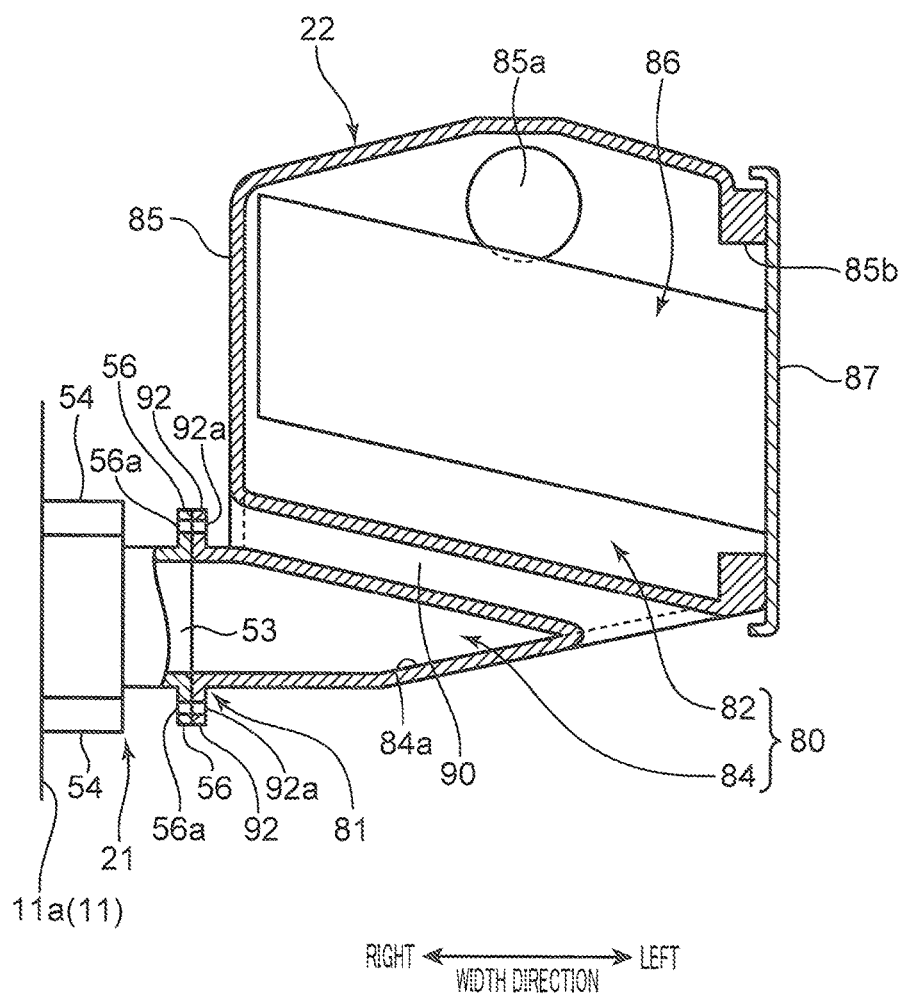
FIG. 19 is a front view of an engine, specifically, illustrating an intake manifold and an intercooler of an intake air cooling device according to a fifth embodiment of the present invention.

FIG. 19 is a front view of an engine, specifically, illustrating an intake manifold and an intercooler of an intake air cooling device of the fifth embodiment.

The intake air cooling device of the fifth embodiment is different from the third embodiment in the configuration of an intercooler 22. An intake manifold 21 in the fifth embodiment is the same as in the third embodiment.

As illustrated in FIG. 19, the intercooler 22 of the fifth embodiment has a structure, in which a cooling core 86 is tilted downwardly from the cylinder head side outwardly toward the side opposite to a cylinder head 11 (from the right side to the left side). Specifically, a plurality of cooling plates (not illustrated) are disposed in such a manner that the positions of the cooling plates are successively displaced downwardly from the cylinder head side toward the side opposite to the cylinder head 11. In view of the above, tool insertion through-holes 90 are also formed to be tilted along the lower surface of the cooling core 86.

The intake air cooling device of the fifth embodiment is also advantageous in suppressing the height of the intercooler 22. Specifically, it is advantageous to form a large space above the cooling core 86, and to allow intake air to pass smoothly toward each of the cooling plates of the cooling core 86 in order to efficiently cool intake air. According to the configuration of the fifth embodiment, the cooling core 86 is tilted downwardly from the cylinder head side outwardly toward the side opposite to the cylinder head 11. This makes it possible to secure a large space as described above, while keeping the ceiling portion of a housing 85 as flat as possible. This is advantageous in suppressing the height of the intercooler 22.

Further, the tool insertion through-holes 90 are formed to be tilted along the lower surface of the cooling core 86. This makes it easy to perform a fastening operation of second and third fixing portions 56 and 92 by inserting a tool through the tool insertion through-holes 90.

Thus, the intake air cooling device of the fifth embodiment is also advantageous in suppressing the height of the intercooler 22, while providing substantially the same advantageous effects as the intake air cooling device of the third embodiment.

The intake air cooling devices of the first to fifth embodiments are merely examples of preferred embodiments of an intake air cooling device for an engine according to the present invention. Specific configurations of the intake air cooling device may be modified as necessary, as far as the modifications do not depart from the gist of the present invention.

For instance, in the aforementioned intake air cooling devices, the cooling cores 60, 70, and 86 are configured to circulate cooling water as a coolant. It may be configured to introduce cooling air for cooling intake air. Further, it may be configured to cool intake air by using cooling water and cooling air in combination.

Further, the intake air cooling device of the second embodiment is configured such that cooling water of a temperature lower than a temperature of cooling water circulating in the first cooling core 60 circulates in the second cooling core 70. It may be configured such that cooling water of substantially the same temperature circulates in the first and second cooling cores 60 and 70. This idea is also applied to a configuration in which cooling air is used as a coolant.

Further, in the intake air cooling device of the second embodiment, the downstream end of the bypass passage 26 (the downstream portion 26b) is connected to the main intake passage 23. Therefore, all the intake air pressurized by the turbochargers 41 and 42 and the electric supercharger 28 is cooled both in the first cooling core 60 and the second cooling core 70. Alternatively, for instance, intake air pressurized by the electric supercharger 28 may be cooled only in the second cooling core 70 by connecting the downstream end of the bypass passage 26 (the downstream portion 26b) to the second cooler forming portion 21b of the intake manifold 21. According to this configuration, it is possible to suppress excessive cooling of intake air pressurized by the electric supercharger 28 when the engine is accelerated immediately after start of the engine. This makes it possible to appropriately cool intake air pressurized by the turbochargers 41 and 42 and the electric supercharger 28 depending on an intake path (a supercharging device).

The following is a summary of the embodiments of the present invention.

An intake air cooling device according to an aspect of the present invention is an intake air cooling device for an engine with a supercharger, the engine including a cylinder head with a surface in which intake ports are opened, and an intake manifold fixed to the surface of the cylinder head and configured to communicate with the intake ports. The intake air cooling device includes an intercooler which is disposed laterally of the cylinder head and is configured to cool intake air. The intake manifold includes a manifold body fastened to the cylinder head and substantially horizontally extending in a direction orthogonal to a cylinder array direction; and a cooler forming portion integrally communicating with an upstream end of the manifold body in an intake air flow direction, and constituting a lower end of the intercooler. When it is assumed that the cooler forming portion is a second cooler forming portion, the intercooler includes a first cooler forming portion to be mounted on an upper portion of the second cooler forming portion, the intercooler being constituted by the first cooler forming portion and the second cooler forming portion. The manifold body includes a plurality of fixing portions to be fastened to the surface of the cylinder head, the plurality of fixing portions being located on the outside of the second cooler forming portion when the engine is viewed from a side in a direction orthogonal to the cylinder array direction.

According to the aforementioned configuration, the second cooler forming portion constituting the lower end of the intercooler is formed in the intake manifold, and the first cooler forming portion is fixed on the upper portion of the second cooler forming portion, whereby the intercooler is constituted by the first cooler forming portion and the second cooler forming portion. This makes it possible to integrally mount the intercooler at a position immediately outside the intake manifold (the manifold body) on the side opposite to the cylinder head, while suppressing lowering the intercooler than the intake ports, and suppressing the intercooler from greatly projecting above the engine. Further, each of the fixing portions of the intake manifold is located on the outside of the second cooler forming portion in a side view along a direction orthogonal to the cylinder array direction. Therefore, fastening the fixing portions to the surface of the cylinder head in a state that the first cooler forming portion is isolated from the second cooler forming portion, and thereafter, fixing the first cooler forming portion on the upper portion of the second cooler forming portion makes it easy to mount the intake manifold and the intercooler on the cylinder head. Thus, according to the aforementioned configuration, it is possible to integrally mount the intercooler at a position immediately outside the intake manifold (the manifold body) on the side opposite to the cylinder head without impairing the assembling performance of the engine.

More specifically, the manifold body may have a shape extending in the cylinder array direction, and may include the fixing portions at a plurality of positions in the cylinder array direction. Out of the fixing portions, a fixing portion at a position associated with the second cooler forming portion in the side view of the engine may be formed on an upper side than an upper surface of the second cooler forming portion or on a lower side than a lower surface of the second cooler forming portion, whereby the fixing portions are located on the outside of the second cooler forming portion in the side view of the engine.

According to the aforementioned configuration, it is possible to dispose the fixing portion at a position associated with the second cooler forming portion outside the second cooler forming portion in a satisfactory manner in the side view of the engine.

In the intake air cooling device, the intercooler may be configured in such a manner that a cooling core for circulating a coolant is disposed in the first cooler forming portion, and the second cooler forming portion may include an upwardly opened recess portion which guides intake air to the manifold body while receiving intake air cooled by the cooling core.

According to the aforementioned configuration, the cooling core is disposed in the first cooler forming portion. This makes it possible to reduce the volume (the occupation space) of the second cooler forming portion, thereby reducing the weight of the second cooler forming portion. This is advantageous in contributing to improvement of an operation of mounting the intake manifold on the cylinder head.

Note that in the intake air cooling device, when it is assumed that the cooling core is a first cooling core, the intercooler may be configured in such a manner that a second cooling core is disposed in the second cooler forming portion.

According to the aforementioned configuration, intake air passes through the first cooling core, and then, passes through the second cooling core. This is advantageous in efficiently cooling intake air.

In the aforementioned configuration, preferably, the second cooling core may circulate a coolant whose temperature is lower than a temperature of the coolant circulating in the first cooling core.

According to the aforementioned configuration, intake air is efficiently cooled by two steps. This is advantageous in enhancing cooling efficiency of intake air.

Further, in the intake air cooling device, preferably, an inner bottom surface of the recess portion may be tilted downwardly toward the manifold body in the direction orthogonal to the cylinder array direction.

According to the aforementioned configuration, even when water contained in intake air is condensed within the intercooler, and droplets of condensed water are generated, the condensed water is speedily introduced to the intake ports together with intake air while being guided to the manifold body side along the inner bottom surface of the recess portion. This is advantageous in suppressing deposition of condensed water on the inner bottom portion of the intercooler, and in preventing in advance a trouble such as an accidental fire due to instantaneous introduction of a large amount of condensed water into the cylinders.

Note that in an intake air cooling device in which an intercooler is provided with the first and second cooling cores, preferably, the engine may include a turbocharger which pressurizes intake air by energy of exhaust gas, a main intake passage which guides intake air pressurized by the turbocharger, and a branch intake passage which is branched from the main intake passage, is provided with an electric supercharger which pressurizes intake air by a driving force of an electric motor, and guides intake air pressurized by the electric supercharger. The main intake passage may communicate with the first cooler forming portion. The branch intake passage may communicate with the second cooler forming portion.

According to the aforementioned configuration, intake air to be introduced to the intercooler through the main intake passage passes through the first and second cooling cores, and intake air to be introduced to the intercooler through the branch intake passage is allowed to pass only through the second cooling core. This makes it possible to appropriately cool intake air depending on an intake path.

An intake air cooling device according to another aspect of the present invention is an intake air cooling device for an engine with a supercharger, the engine including a cylinder head with a surface in which intake ports are opened, an intake manifold fixed to the surface of the cylinder head and configured to communicate with the intake ports, and an intercooler communicating with an upstream end of the intake manifold in an intake air flow direction. The intake manifold includes a plurality of first fixing portions to be fastened to the surface of the cylinder head, and a plurality of second fixing portions respectively formed at positions closer to the intercooler than the first fixing portions. The intercooler includes an intercooler body which cools intake air; a connecting portion formed at a substantially lower end of a surface of the intercooler body, and communicating with an upstream end of the intake manifold in the intake air flow direction; and a plurality of third fixing portions respectively formed on the connecting portion at positions opposite to the second fixing portions. The intake manifold and the intercooler are connected by causing the upstream end of the intake manifold in the intake air flow direction and the connecting portion of the intercooler to abut against each other, and by fastening the second fixing portions and the third fixing portions by bolts and nuts. The intercooler body includes a tool insertion through-hole passing in the intercooler body in a direction orthogonal to a cylinder array direction, and allowing insertion of a bolt and nut fastening tool.

According to the aforementioned configuration, first of all, the intake manifold as a single member is fixed to the surface of the cylinder head by fastening the first fixing portions. Thereafter, causing the upstream end of the intake manifold in the intake air flow direction, and the connecting portion of the intercooler to abut against each other, inserting a tool into the tool insertion through-hole of the intercooler, and fastening the second and third fixing portions by bolts and nuts makes it easy to mount the intake manifold and the intercooler on the cylinder head. This makes it possible to dispose the intercooler laterally of the cylinder block, while suppressing lowering the intercooler than the intake ports, and suppressing the intercooler from greatly projecting above the engine without impairing the assembling performance of the engine.

In the aforementioned configuration, preferably, the first fixing portions may be formed at a plurality of positions circumferentially on an outer surface of the intake manifold, and the second fixing portions may be formed at a plurality of positions circumferentially on the outer surface of the intake manifold, the positions of the second fixing portions being different from the positions of the first fixing portions.

According to the aforementioned configuration, the first fixing portions and the second fixing portions are offset from each other circumferentially. This is advantageous in facilitating an operation of fastening the first fixing portions to the surface of the cylinder head.

Note that the intake manifold may include a plurality of independent passages communicating with the intake ports; and a collecting portion located on an upstream side in the intake air flow direction than the independent passages, the collecting portion being a space where the independent passages are collected. A surge tank constituted by an internal space of the connecting portion of the intercooler and the collecting portion may be formed by cooperation of the connecting portion of the intercooler.

According to the aforementioned configuration, it is possible to secure a relatively large space (a surge tank) required on the upstream side of the independent passages in a satisfactory manner.

In the intake air cooling device, preferably, the intercooler body may include a cooling portion with a cooling core for circulating a coolant; and a guiding portion located below the cooling portion, and configured to guide intake air cooled through the cooling core to the connecting portion. The tool insertion through-hole may be formed in the guiding portion.

According to the aforementioned configuration, the position of the tool insertion through-hole is less likely to be affected by the cooling core. This is advantageous in increasing the degree of freedom on the position of the tool insertion through-hole, consequently, on the positions of the second and third fixing portions.

Note that in the intake air cooling device, when the surface of the cylinder head is a tilted surface tilted obliquely upwardly, preferably, the intake manifold may extend vertically with respect to the surface of the cylinder head, with an upstream end of the intake manifold in the intake air flow direction being formed of a vertical surface. The first fixing portions may be formed along the surface of the cylinder head. The second fixing portions may be formed vertically along the upstream end of the intake manifold.

According to the aforementioned configuration, it is possible to suppress the intercooler from greatly projecting above the engine body when a cylinder head is disposed within an engine room in a tilted state. Further, it is possible to perform an operation of fastening the intake manifold and the intercooler (an operation of fastening the second fixing portions and the third fixing portions) horizontally. This is advantageous in contributing to improvement of the assembling performance.

Further, in the intake air cooling device, preferably, the cooling core may have a shape tilted downwardly from a cylinder head side toward a side opposite to the cylinder head, and the tool insertion through-hole may be tilted along the cooling core.

The aforementioned configuration is also advantageous in improving operability in fastening the intake manifold and the intercooler (an operation of fastening the second fixing portions and the third fixing portions) while suppressing the intercooler from greatly projecting above the engine body.

This application is based on Japanese Patent Application No. 2016-024927 and No. 2016-024928 filed in Japan Patent Office on Feb. 12, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An intake air cooling device for an engine with a supercharger, the engine including a cylinder head with a surface in which intake ports are opened, and an intake manifold fixed to the surface of the cylinder head and configured to communicate with the intake ports, the intake air cooling device comprising:
   an intercooler which is disposed laterally of the cylinder head and is configured to cool intake air; wherein
   the intake manifold includes:
      a manifold body fastened to the cylinder head and substantially horizontally extending in a width direction of the engine that is a direction orthogonal to a cylinder array direction; and
      a cooler forming portion integrally communicating with an upstream end of the manifold body in an intake air flow direction, and constituting a lower end of the intercooler,
   the intercooler includes a second cooler forming portion serving as the cooler forming portion, a first cooler forming portion to be mounted on an upper portion of the second cooler forming portion, the intercooler being constituted by the first cooler forming portion and the second cooler forming portion, and
   the manifold body includes fixing portions to be fastened to the surface of the cylinder head at a plurality of corresponding positions in the cylinder array direction, the plurality of fixing portions including:
      a fixing portion formed on an upper side that is higher than an upper surface of the second cooler forming portion and thereby being located on an outside of the second cooler forming portion; and
      another fixing portion formed on a lower side that is lower than a lower surface of the second cooler forming portion and thereby being located on the outside of the second cooler forming portion, respectively at positions associated with the second cooler forming portion when the engine is viewed from a side in the width direction.

2. The intake air cooling device for an engine according to claim 1, wherein
   the intercooler is configured in such a manner that a cooling core for circulating a coolant is disposed in the first cooler forming portion, and
   the second cooler forming portion includes an upwardly opened recess portion which guides intake air to the manifold body while receiving intake air cooled by the cooling core.

3. The intake air cooling device for an engine according to claim 2, wherein
   the intercooler includes a first cooling core serving as the cooling core, and a second cooling core is disposed in the second cooler forming portion.

4. The intake air cooling device for an engine according to claim 3, wherein the second cooling core circulates a coolant whose temperature is lower than a temperature of the coolant circulating in the first cooling core.

5. The intake air cooling device for an engine according to claim 2, wherein
an inner bottom surface of the recess portion is tilted downwardly toward the manifold body in the direction orthogonal to the cylinder array direction.

6. The intake air cooling device for an engine according to claim 2, wherein
the engine includes:
a turbocharger which pressurizes intake air by energy of exhaust gas,
a main intake passage which guides intake air pressurized by the turbocharger, and
a branch intake passage which is branched from the main intake passage, is provided with an electric supercharger which pressurizes intake air by a driving force of an electric motor, and guides intake air pressurized by the electric supercharger,
the main intake passage communicates with the first cooler forming portion, and
the branch intake passage communicates with the second cooler forming portion.

7. An intake air cooling device for an engine with a supercharger, the engine including a cylinder head with a surface in which intake ports are opened, an intake manifold fixed to the surface of the cylinder head and configured to communicate with the intake ports, and an intercooler communicating with an upstream end of the intake manifold in an intake air flow direction, wherein
the intake manifold extends in a width direction of the engine that is a direction orthogonal to a cylinder array direction, and includes: a plurality of first fixing portions to be fastened to the surface of the cylinder head at one end of the intake manifold; and a plurality of second fixing portions at an other end of the intake manifold,
the intercooler includes:
an intercooler body which cools intake air;
a connecting portion formed at a substantially lower end of a surface of the intercooler body, and communicating with an upstream end of the intake manifold in the intake air flow direction; and
a plurality of third fixing portions respectively formed on the connecting portion at positions opposite to the second fixing portions,
the intercooler body including:
a cooling portion with a cooling core for circulating a coolant; and
a guiding portion located below the cooling portion, and configured to guide the intake air cooled through the cooling core to the connecting portion,
the intake manifold and the intercooler are connected by causing the upstream end of the intake manifold in the intake air flow direction and the connecting portion of the intercooler to abut against each other in the width direction, and by fastening the second fixing portions and the third fixing portions by bolts and nuts,
the intercooler body further includes a tool insertion through-hole passing in the guiding portion of the intercooler body in the width direction, and allowing insertion of a bolt and nut fastening tool, and
the tool insertion through-hole is opened in the width direction and defined such that each of the second fixing portions and the third fixing portions is positioned on an axis of the tool insertion through-hole.

8. The intake air cooling device for an engine according to claim 7, wherein
the first fixing portions are formed at a plurality of positions circumferentially on an outer surface of the intake manifold, and
the second fixing portions are formed at a plurality of positions circumferentially on the outer surface of the intake manifold, the positions of the second fixing portions being different from the positions of the first fixing portions.

9. The intake air cooling device for an engine according to claim 7, wherein
the intake manifold includes:
a plurality of independent passages communicating with the intake ports; and
a collecting portion located on an upstream side in the intake air flow direction than the independent passages, the collecting portion being a space where the independent passages are collected, and
a surge tank constituted by an internal space of the connecting portion of the intercooler and the collecting portion is formed by cooperation of the connecting portion of the intercooler.

10. The intake air cooling device for an engine according to claim 7, wherein
the surface of the cylinder head is a tilted surface tilted obliquely upwardly,
the intake manifold extends vertically with respect to the surface of the cylinder head, with an upstream end of the intake manifold in the intake air flow direction being formed of a vertical surface,
the first fixing portions are formed along the surface of the cylinder head, and
the second fixing portions are formed vertically along the upstream end of the intake manifold.

11. An intake air cooling device for an engine with a supercharger, the engine including a cylinder head with a surface in which intake ports are opened, an intake manifold fixed to the surface of the cylinder head and configured to communicate with the intake ports, and an intercooler communicating with an upstream end of the intake manifold in an intake air flow direction, wherein
the intake manifold includes a plurality of first fixing portions to be fastened to the surface of the cylinder head, and a plurality of second fixing portions respectively formed at positions closer to the intercooler than the first fixing portions,
the intercooler includes:
an intercooler body which cools intake air;
a connecting portion formed at a substantially lower end of a surface of the intercooler body, and communicating with an upstream end of the intake manifold in the intake air flow direction; and
a plurality of third fixing portions respectively formed on the connecting portion at positions opposite to the second fixing portions,
the intercooler body includes:
a cooling portion with a cooling core for circulating a coolant; and
a guiding portion located below the cooling portion, and configured to guide intake air cooled through the cooling core to the connecting portion,
the intake manifold and the intercooler are connected by causing the upstream end of the intake manifold in the intake air flow direction and the connecting portion of the intercooler to abut against each other, and by fastening the second fixing portions and the third fixing portions by bolts and nuts, the intercooler body includes a tool insertion through-hole passing in the intercooler body in a direction orthogonal to a cylinder array direction, and allowing insertion of a bolt and nut fastening tool, the cooling core has a shape tilted downwardly from a cylinder head side toward a side opposite to the cylinder head, and the tool insertion through-hole is tilted along the cooling core.

* * * * *